United States Patent [19]

Ulug

[11] Patent Number: 4,701,911
[45] Date of Patent: Oct. 20, 1987

[54] MEDIA ACCESSING APPARATUS AND METHOD FOR COMMUNICATION SYSTEM

[75] Inventor: Mehmet E. Ulug, Schenectady, N.Y.

[73] Assignee: General Electric Company, Schenectady, N.Y.

[21] Appl. No.: 907,439

[22] Filed: Sep. 15, 1986

[51] Int. Cl.[4] .............................. H04J 3/02; H04J 3/24
[52] U.S. Cl. ........................................ 370/85; 370/94; 340/825.5
[58] Field of Search .................. 370/85, 86, 89, 94, 370/92; 340/825.5

[56] References Cited

U.S. PATENT DOCUMENTS

| | | | |
|---|---|---|---|
| 4,161,786 | 7/1979 | Hopkins et al. | 370/85 |
| 4,313,196 | 1/1982 | Oblonsky | 370/85 |
| 4,464,749 | 8/1984 | Ulug | 370/85 |
| 4,510,599 | 4/1985 | Ulug | 370/85 |
| 4,517,670 | 5/1985 | Ulug | 370/85 |
| 4,532,626 | 7/1985 | Flores et al. | 370/85 |

OTHER PUBLICATIONS

"Transmission, Modulation, and Noise", by M. Schwartz, McGraw-Hill, Second Edition, 1959, pp. 131–163.

Primary Examiner—Douglas W. Olms
Assistant Examiner—Frank M. Scutch, III
Attorney, Agent, or Firm—Richard V. Burgujian; James C. Davis, Jr.; Paul R. Webb, II

[57] ABSTRACT

Apparatus and method for bus accessing, in a communication system, effective to minimize user to user delay variance is disclosed. The communication system comprises a transmit bus, a receive bus, a plurality of BIUs coupled between the buses, and a head-end coupled between the buses at one end for directing signals from the transmit bus onto the receive bus and further for intermittently alternately transmitting a left sweep or right sweep startup packet onto the receive bus. Upon receipt of the startup packet, each BIU having an information packet to transmit, transmits a beep signal and then subsequently receives its own beep as well as the beeps transmitted by other BIUs. Each BIU determines a transmission ranking for itself according to the number of beeps received before or after receiving its own beep depending on whether the startup packet was respectively a right sweep or left sweep type. The BIUs then transmit information packets in a sequence according to their respectively determined transmission rankings. After information packet transmission, each BIU enters a captive mode in which it refrains from signal transmission until transmission of a subsequent startup packet in response to which no beeps are transmitted. In an alternate embodiment, the transmit and receive buses comprise fiber optic cables and the signals communicated thereon are time division multiplexed.

45 Claims, 13 Drawing Figures

MEDIA ACCESSING APPARATUS AND METHOD FOR COMMUNICATION SYSTEM

The present invention relates in general to communication systems and more specifically to an improved method and apparatus for transmitting information messages in a communication system.

BACKGROUND OF THE INVENTION

In known local area communication systems, each of a plurality of user devices is connected to the communication system buses via a bus interface unit (BIU). Each BIU, using a particular media access protocol, occasionally places an information packet from its associated user device on a transmission bus of the system, for transmission to other user devices via their respective BIUs. The instant at which a BIU places the information packet from its user device on the transmission bus is determined by the particular media access protocol that is being used. Bus accessing protocols generally fall into either of two categories, i.e., token passing or contention.

Generally, explicit token passing methods employ a token signal which is passed from BIU to BIU in a given order within the communication system, each BIU being permitted to transmit information packets only after receiving the token signal. Thereafter, each BIU transmits the token signal such that another BIU is permitted to transmit its information packets. Token passing methods substantially preclude collisions between information packets. As a penalty, however, they incur unacceptable delays during periods where few BIUs have information packets to transmit and, therefore, those few BIUs having packets to transmit must wait until the token signal is passed among the plurality of BIUs not having packets to transmit before gaining access to the transmission bus.

Contention methods are those in which each BIU may gain access to the transmission bus for transmitting its information packet at any time the subject BIU determines the transmission bus is idle. When more than one BIU attempts to gain access to the transmission bus simultaneously, a collision occurs and each BIU, generally, discontinues its transmission for a randomly selected interval after which it reattempts to gain access. Systems practicing contention methods, however, incur unacceptable delays at times when many BIUs have information packets to transmit since at such times many collisions occur. Additionally, such systems require including in the BIU means for sensing when the transmission bus is idle as well as means for generating the random time interval following a collision.

Where a communication system carries voice encoded signals, it is desirable to minimize delays experienced by BIUs in gaining access to the transmission bus. In such cases, it is especially desirable to minimize the variance in the delays experienced in user to user communications, regardless of user location on the communication system.

As described above, both token passing and contention methods experience transmission delays that increase in magnitude with the number of users, and hence BIUs, utilizing the communication system. However, the significant installed cost of transmission media, i.e. coaxial or fiber optic cables, dictates that maximum utilization be made of the medium. Thus, the need exists for a communication system in which user utilization can be maximized without suffering unacceptable transmission delays.

OBJECTS OF THE INVENTION

It is a principal object of the present invention to provide a new and improved bus accessing protocol and apparatus which is not subject to the aforementioned problems and disadvantages.

Another object of the present invention is to provide a new and improved bus accessing protocol and apparatus in which no delay is introduced by BIUs having no information packets to transmit.

A further object of the present invention is to provide a bus accessing protocol and apparatus in which collisions do not occur.

An additional object of the present invention is to provide a bus accessing protocol and apparatus in which it is not necessary to sense when the transmission bus is idle.

Yet another object of the present invention is to provide a bus accessing protocol and apparatus in which the user to user delay variance is minimized.

Yet a further object of the present invention is to provide a bus accessing protocol and apparatus in which utilization of the transmission medium is maximized without incurring unacceptable transmission delays.

SUMMARY OF THE INVENTION

The foregoing objects are accomplished by the present invention which is directed to a bus accessing method and a communication system for practicing the method. The communication system comprises a transmit bus, receive bus, means for directing signals leaving the transmit bus onto the receive bus and a plurality of bus interface units (BIU) respectively coupled between the transmit and receive buses, each BIU being coupled to a user device for which it transmits and receives information packets. The directing means includes means for alternately transmitting on the receive bus either a first or second type of startup packet which is received by the BIUs at times determined by their respective individual locations along the receive bus. Each BIU having an information packet to transmit is in a transmit state and transmits a signal, referred to hereinafter as a beep, upon receiving the startup packet. Each transmit state BIU receives on the receive bus the transmitted beeps of all transmit state BIUs, counts a number of beeps received before or after receiving its own beep, respectively, according to whether the startup packet was of the first or second type, and then determines a transmission ranking from the number of beeps counted. The transmit state BIUs then commence transmission of their information packets in sequence according to their respective determined transmission rankings. Each transmit state BIU, following transmission of its information packet, enters a captive mode during which it refrains from all transmissions and remains in that mode until a subsequent startup packet in response to which no beeps are transmitted.

In one embodiment of the present invention, information packets requiring minimal user to user delay variance are assigned a first priority classification while the balance of packets are second priority. Then, each transmit state BIU transmits a beep including an indication of priority and subsequently, in determining transmission ranking, BIUs that transmitted a first priority beep are accorded a higher transmission ranking.

In an alternate embodiment of the present invention, the transmit and receive buses are fiber optic cable and communication between the BIUs is time division multiplexed.

These and other objects of the invention, together with the features and advantages thereof, will become apparent from the following detailed description when read together with the accompanying drawings in which applicable reference designations have been carried forward.

DESCRIPTION OF THE INVENTION

Figure 1:
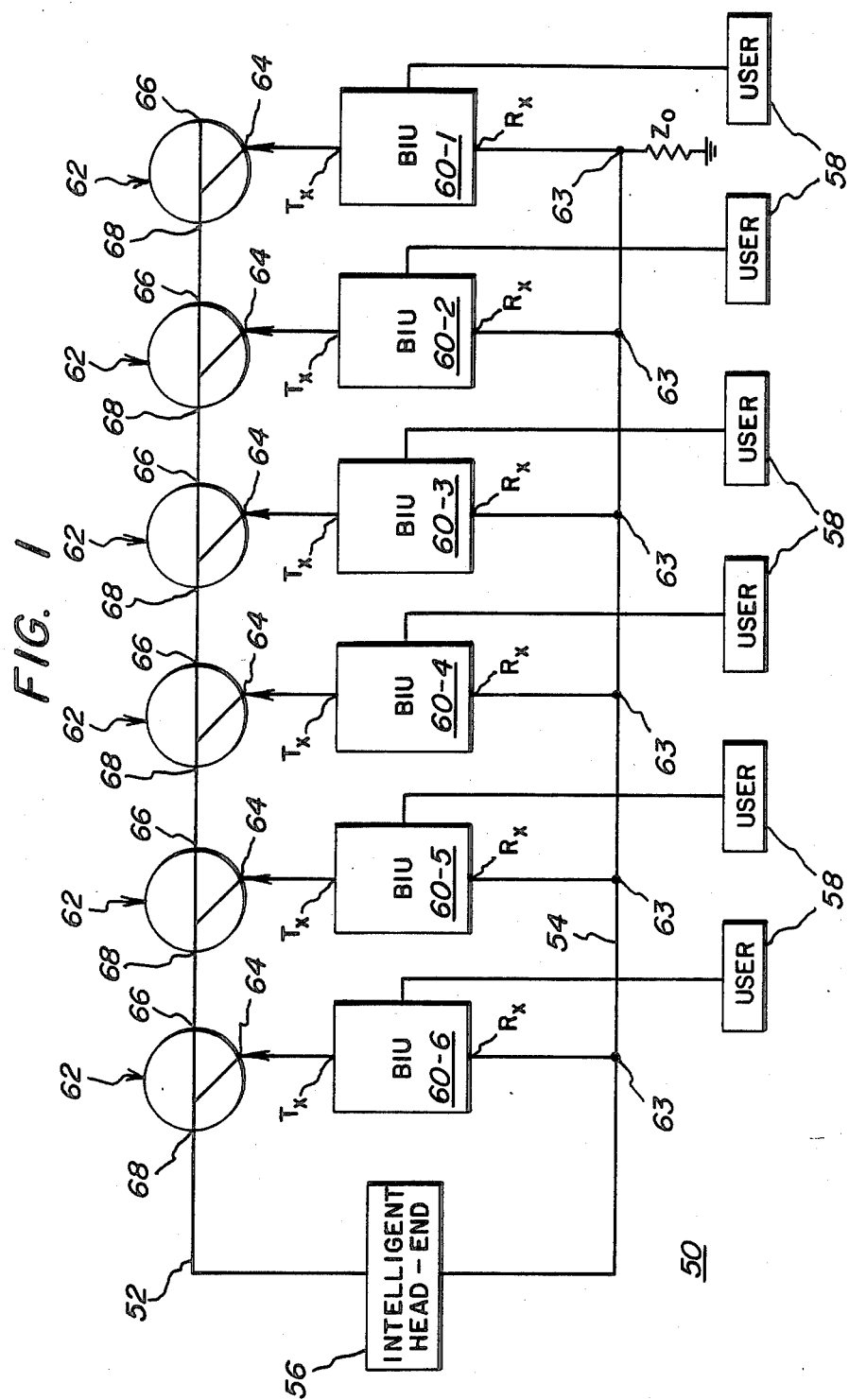
FIG. 1 is a block diagram of a communication system including apparatus which is the subject of the present invention and adapted to practice the method of the present invention.

Referring now to the drawings, FIG. 1 shows a bus communication system 50 in which the bus accessing method of the present invention may be practiced. System 50 comprises a signal transmission network including a transmit bus 52 and a receive bus 54, each bus being connected as a serial straight-line topology. An intelligent head-end device 56 is provided for receiving transmission signals from transmit bus 52 and directing, by retransmission, these signals onto receive bus 54. Each bus 52 and 54 comprises a transmission medium such as a fiber optic or a coaxial cable and is unidirectional in operation. For example, the transmit and receive buses may each comprise a coaxial cable, as available from Belden Electric and Wire Cable Company, for transmitting AC modulated digital information signals. As a further example, the buses may comprise high performance fiber optic cable, such as is available from Hewlett Packard Company, part number HFBR3001, for transmitting optical digital information signals. It will be appreciated by those skilled in the art that while transmit bus 52 and receive bus 54 are shown as discrete elements in FIG. 1, they may actually comprise the same physical coaxial cable wherein transmissions occur at a first electrical frequency and reception occurs at a second electrical frequency. If necessary, the pair of buses 52 and 54 may be folded upon itself to provide a star or branching tree topology.

Signals on transmit bus 52 propagate in a downstream direction toward intelligent head-end 56 while signals on receive bus 54 propagate in an upstream direction away from the head-end. The end of receive bus 54 remote from the head-end may be terminated in a characteristic impedance $Z_O$ when buses 52 and 54 consist of coaxial cables and with a dark surface when the buses consist of fiber optic cables. Bus 54 is so terminated in order to dissipate signals and prevent reflections thereof along the bus.

A plurality of user terminals or data terminal equipment 58 are connected to buses 52 and 54 via a plurality of bus interface units (BIU) 60-1, 60-2, 60-3, 60-4, 60-5 and 60-6 (each BIU being generically referred to hereinafter as BIU 60), the BIUs being connected in parallel with one another between buses 52 and 54. Illustrated system 50 contains only six BIUs in order to facilitate the description of the present invention. However, the present invention may be practiced in a communication system comprising a substantially greater number of BIUs. The terms upstream and downstream as used herein with respect to the BIUs indicate BIU 60-1 as being the most upstream and BIU 60-6 being the most downstream. Each BIU 60 may have a plurality of user terminals coupled thereto, typically via ports (not shown) wherein each port of BIU 60 is assigned an identification address. User terminals 58 may be computers, terminals or other devices capable of generating and/or accepting electronic information. System 50 enables any user terminal 58 to transmit messages to any other user terminal 58.

Each BIU 60 receives messages from the user terminal(s) coupled thereto for transmission to other user terminals and formats the data into an information packet. In order to transmit the information packet, the BIU places the packet to be transmitted on transmit bus 52, the method by which each BIU gains access to bus 52 for the purpose of transmitting its packet being more fully described below. Information packets are received by each BIU 60 via receive bus 54 after being directed thereon by head-end 56. As described above, head-end 56 is provided for receiving transmissions from the transmit bus and retransmitting this information onto the receive bus. When the transmit and receive buses comprise the same physical cable, head-end 56 may be further adapted to receive signals from transmit bus 52 over a first frequency and retransmit these signals to receive bus 54 over a second frequency. Similarly, where the transmit and receive buses comprise separate physical cables, as is preferred herein, head-end 56 may be adapted to frequency division multiplex the signals by transmitting and receiving over a plurality of different frequencies where the different frequencies correspond to different communication channels to which the BIUs are assigned. Alternatively, where the transmit and receive buses comprise separate physical cables, head-end 56 may comprise a repeater or other similar device for receiving and retransmitting signals and need not comprise a frequency translator as described above. In addition to receiving and retransmitting signals, head-end 56 also includes means for periodically generating a startup packet signal and means for counting information packets and beep signals generated by the BIUs, for purposes more fully described below.

Where buses 52 and 54 consist of coaxial cable, each BIU 60 is coupled to transmit bus 52 through a directional coupler 62. Each directional coupler 62 has low insertion loss (typically less than 1 db) in the straight through transmission path of bus 52 and a high reverse coupling factor (typically at least 30 db) between an input port 64 thereof connected to a transmit port $T_x$ of BIU 60 and another input port 66 thereof connected to bus 52 from upstream BIUs. The forward coupling factor from input port 64 of the directional coupler to an output port 68 thereof is typically about 12 db. Directional coupler 62 may comprise a CATV tap model DC-12B as available from the Jerrold Electronics Company. A receive port $R_x$ of each BIU 60 is connected to receive bus 54 by a coupler 63 which affords minimal insertion loss, preferably less than 1 db. Where buses 52 and 54 are constructed of fiber optic cable, each BIU is coupled thereto by passive couplers, such as manufactured by ADC Magnetic Controls Company of Minneapolis, Minnesota as a 3 port coupler model PFC.

The manner in which user terminal information or data is transmitted from user terminals 58 to their respective BIUs 60, and the method of properly formatting data from information packets as the data are transferred to each user terminal from the BIU associated therewith, are well known in the art and do not form part of the present invention. Accordingly, the specific methods and apparatus for carrying out these transfers will not be described herein. Data as used herein includes digital data, encoded voice and other forms of intelligence which may be transferred between components of the system. An exemplary method for achieving these results may be found in International Standard CCITT X.25. The present invention concerns the bus accessing method under which the information packets, once properly formatted according to a packet-switching mode of operation, are transferred from BIUs 60 to bus 52. Accordingly, it is assumed that information or data is occasionally transferred from user terminals 58 to their associated BIUs 60 and is formatted for transmission by BIU 60. It is also assumed that information packets received by BIUs 60 are reformatted and the data or voice messages therefrom are transferred to their appropriate associated user terminals.

In accordance with the bus accessing method of the present invention, the BIUs of system 50 are initially in a free mode of operation. Intermittently, head-end 56 generates a signal in the form of a startup packet and transmits the packet on receive bus 54. The startup packet propagates in the upstream direction and is received in sequence by each BIU. Relative to completion of transmission of the startup packet by the head-end, each BIU receives that packet at a different time determined by the signal propagation time along receive bus 54. By arbitrarily setting completion of startup packet transmission to occur at time $t=0$, BIU 60-1 through BIU 60-6 respectively receive the end of the startup packet at times $t=T_1$, $T_2$, $T_3$, $T_4$, $T_5$ and $T_6$ where generally, $T_i$ is the signal propagation time along receive bus 54 from head-end 56 to BIU 60-i. Thus:

$$T_6 < T_5 < T_4 < T_3 < T_2 < T_1.$$

Generally, both startup and information packets include a preamble portion identifying them as packets. Further, each packet includes a header portion uniquely identifying it as either a startup or information packet. More specifically, the startup packet may consist of from 3 to 10 bytes and take either of two forms, i.e., a left sweep or a right sweep startup packet. As the head-end periodically transmits startup packets, it alternates between left sweep and right sweep startup packets. Initial operation of system 50 can be commenced with either a left or right sweep startup packet. Further, in practicing the method of the present invention, BIUs 60 can each distinguish between left and right sweep startup packets and respond appropriately thereto as described below.

Completing transmission of the startup packet, at $t=0$, commences a system communication period having a duration equal to T where T is the one-way signal propagation time along either the transmit or receive bus. It is assumed herein that in addition to the propagation delay incurred along each bus, a delay is introduced by the head-end. For convenience, the head-end delay is assumed to be evenly divided between the transmit and receive buses. As a result, T includes bus propagation time (along either the transmit or receive bus) and one-half the delay introduced by the head-end and 2T is the time for a signal to propagate from the remote, upstream end of transmit bus 52 to the remote, upstream end of receive bus 54. For convenience in describing the method of the present invention, it is assumed that the transmit and receive buses are routed together such that they have the same length and the same one-way propagation delay, i.e., T. For example, where the transmit and receive buses are respectively two strands of a fiber optic cable, they will have the same length and propagation delay. A further result of this assumption is that the signal propagation times $T_i$ between the head-end and the respective BIUs is substantially the same along both the transmit and receive buses. Note additionally, that each propagation time $T_i$ includes one-half the delay introduced by the head-end. As a result, generally, the time required for a signal transmitted by BIU 60-i to propagate along transmit bus 52 to the head-end and then along receive bus 54 to the same BIU which transmitted the signal is equal to $2T_i$.

During the system communication period, the startup packet propagates to the remote upstream end of receive bus 54. Each BIU in the free mode and having an information packet to transmit, each such BIU being hereinafter referred to as a transmit state BIU, upon receiving the end of the startup packet generates and transmits a ready signal, hereinafter referred to as a beep, on transmit bus 52. The beep may take the form of a short modulated signal, e.g., 8 bits consisting of alternate zeros and ones. It is preferred herein that the beep be transmitted substantially immediately upon receiving the startup packet, i.e. within a fraction of a microsecond.

The beeps transmitted by the transmit state BIUs thus propagate along transmit bus 52 to head-end 56 which directs them, by retransmission, onto receive bus 54. The beeps propagate along receive bus 54 and are received by all BIUs in system 50. The receipt of the beeps is, however, only of significance to the transmit state BIUs. Since the propagation times along buses 52 and 54 are known, the times at which each BIU receives the beeps transmitted by the transmit state BIUs, are determinable. Further, with respect to system 50, the times at which the beeps are received at a particular BIU are in direct proportion to the physical distance upstream along buses 52 and 54 at which each transmit state BIU is located. Those BIUs further upstream receive the startup packet at a later time and the further upstream a BIU is located, the longer it takes the beep transmitted thereby to propagate to a receiving BIU. Thus, a BIU will receive the beeps transmitted by transmit state BIUs in a sequence according to their respective physical locations along the buses.

For example, if BIUs 60-1 through 60-4 are in the transmit state, BIU 60-4 receives the startup packet first followed in sequence by BIUs 60-3, 60-2 and 60-1. Since each transmit state BIU transmits a beep substantially immediately upon receipt of the end of the startup packet, BIU 60-4 is the first to transmit a beep, followed in sequence by BIUs 60-3, 60-2 and 60-1. Due to the signal propagation times along buses 52 and 54 as well as the different times at which the beeps are transmitted, each BIU in system 50 receives, in sequence, the beeps transmitted by BIU 60-4, 60-3, 60-2 and 60-1.

Generally, measuring time from t=0 when the head-end completes transmission of the startup packet, BIU 60-i receives the end of the startup packet on receive bus 54 at $t=T_i$. Assuming BIU 60-i is in the transmit state, it then substantially immediately transmits a beep on transmit bus 52 which arrives at the head-end at $t=2T_i$. The beep is directed onto receive bus 54 by retransmission by the head-end and is received by BIU 60-i at time $t=3T_i$ or by another BIU 60-j at $t=2T_i+T_j$.

It is readily apparent from the discussion above that from the perspective of the BIU transmitting a beep, it receives its own beep after a time period equal to $2T_i$. Each transmit state BIU uses this information, in a manner more fully described below, to recognize, upon receipt, a principal beep which is the beep transmitted thereby. Further, each transmit state BIU counts the number of beeps received either before or after receipt of its principal beep. Where the startup packet is a right sweep packet, each transmit state BIU counts the number of beeps it receives prior to receipt of the principal beep. From this count, it determines a transmission ranking for itself relative to the other transmit state BIUs. If a transmit state BIU receives its principal beep first, it determines that it is the first ranked BIU. Note that each BIU receives the beeps transmitted by all transmit state BIUs within a beep propagation period, equal to 2T, measured independently by each BIU and commencing upon receipt by the BIU of the end of the startup packet. In general, no BIU may transmit an information packet until the end of the beep propagation period as measured thereby. Thus, the first ranked BIU waits until the end of the beep propagation period and then commences transmitting its information packet.

If, following the right sweep packet, a transmit state BIU receives one beep prior to the principal beep, this means there is one BIU having a higher transmission ranking and therefore this BIU determines it is the second ranked BIU. Since the BIUs each receive the transmission of all other BIUs, the second ranked BIU receives the information packet transmitted by the first ranked BIU. Upon receiving the end of that information packet, the second ranked BIU commences transmitting its own information packet. In general, a transmit state BIU receiving m beeps prior to the principal beep determines it is the $(m+1)^{th}$ ranked BIU. That BIU waits until m information packets are transmitted and then transmits its own information packet. Note that while each BIU receives the information packets transmitted by other BIUs, it need not retain such packets if not intended therefor but need only be able to recognize the end of each information packet in order to count the number of information packets transmitted.

Where the startup packet is a left sweep packet, each transmit state BIU counts the number of beeps it receives after receiving the principal beep. The first ranked BIU is the one receiving no beeps after receiving the principal beep. The second ranked BIU receives one beep after the principal beep and so on. Again, the first ranked BIU waits until the end of the beep propagation period and then transmits its information packet first, followed by each succeedingly lower ranked BIU transmitting its respective information packet.

A right sweep startup packet affords higher transmission ranking to the more downstream transmit state BIUs while the left sweep packet affords the higher transmission ranking to those transmit state BIUs located more upstream. For example, referring to FIG. 1, if BIUs 60-1 and 60-6 are the only transmit state BIUs, in a right sweep, BIU 60-6 would be first ranked. However, in a left sweep, BIU 60-1 would be first ranked. Thus, by alternating between left and right sweep startup packets, the method of the present invention minimizes BIU physical location as a factor in determining BIU accessibility to the transmission bus. This feature further serves to minimize the user to user delay variance.

Each transmit state BIU, upon completing transmission of an information packet, enters a captive mode in which it refrains from transmitting beeps and information packets. Head-end 56 includes means for counting the number of beeps and information packets transmitted by BIUs as it directs those signals onto receive bus 54 and thus can determine when the lowest ranked transmit state BIU has transmitted its information packet. After completion of the transmission by the lowest ranked BIU, the head-end initiates a new communication period by transmitting, on receive bus 54, a startup packet of a form opposite to that of the previous startup packet. Thus, where the previous startup packet is a left or right sweep packet, the packet initiating the new communication period is respectively a right or left sweep packet. During the new communication period, each BIU in the captive mode cannot transmit a beep even if it has an information packet, from its user 58, for transmission. Only those BIUs still in the free mode and having an information packet to transmit, i.e., in the transmit state, may transmit a beep during the new communication period. Following this communication period, transmission ranking is again determined, in accordance with the type of startup packet, i.e., left or right sweep, and the information packets held by the transmit state BIUs are transmitted in accordance with the determined transmission ranking.

BIUs in the captive mode remain there until occurrence of a subsequent communication period during which no BIUs transmit a beep. The BIUs in the captive mode thus receive the startup packet initiating this subsequent communication period and receive no beeps during the beep propagation period. On this basis, the captive mode BIUs conclude that the captive mode is terminated. Upon transmission of the next startup packet, they again operate in the free mode.

The bus accessing method of the present invention, as described thus far, addresses the special considerations required when transmitting voice or other signals requiring minimum user to user delay variance insofar as it allows access to the bus in a manner minimizing BIU physical location as a factor. In order to further minimize user to user delay variance, also referred to herein as time transparency, it is necessary that no appreciable delay be introduced between the end of one transmitted information packet and the beginning of the next packet to be transmitted where the packets are destined for the same user terminal. In the preferred embodiment of the present invention, time transparency considerations are addressed by assigning a first priority classification to information packets requiring time transparency. Information packets not requiring time transparency are assigned a second priority classification. Each user terminal includes an indication of the appropriate priority classification in the data provided to its respective BIU for transmission. Each BIU reads the classification and modifies the beep transmitted thereby to reflect the priority classification of the information packet to be transmitted. For example, the beep described above consisting of 8 bits of alternating zeros and ones may indicate that a second priority classification information packet is to be transmitted. Then, any other code for the beep, e.g., "10011010", can serve to indicate that a first priority classification information packet is held by the BIU for transmission.

Upon receiving the beeps transmitted during the communication period, each transmit state BIU queues the beeps, including the principal beep. Where the beeps follow a right sweep startup packet, they are placed in the queue in the sequence they are received except that beeps having a higher priority than the principal beep are placed before the principal beep and beeps having a lower priority than the principal beep are placed after the principal beep. Following a left sweep startup packet, the beeps are placed in the queue in the sequence received except that beeps having a higher priority than the principal beep are placed after the principal beep and beeps having a lower priority than the principal beep are placed before it. Transmission ranking is then determined by counting the number of beeps before or after the principal beep, in the queue, following a right or left sweep startup packet, respectively.

The queuing of beeps with consideration of priority classification may be better understood by the following example. Assume that BIUs 60-1 through 60-6 are in the transmit state and the information packets held by BIUs 60-3 and 60-5 each have a first priority classification while the remaining BIUs each hold second priority packets. Then, following a right sweep startup packet, though BIU 60-6 receives its principal beep first, it places two first priority beeps (from BIUs 60-3 and 60-5) ahead of the principal beep in the queue maintained thereby. The other second priority beeps (from BIUs 60-1, 60-2 and 60-4) are placed after the principal beep since they are not of a higher classification and are received after the principal beep. The number of beeps in the queue before the principal beep are then counted to determine that BIU 60-1 is ranked third.

Thus, in practicing the bus accessing method of the present invention, there is substantially no possibility of collisions between signals transmitted by the individual BIUs. Further, in order for each BIU to determine when it is to transmit, there is no need to provide additional apparatus for detecting energy on the transmit bus, as is required in the practice of known contention methods.

Figure 2:
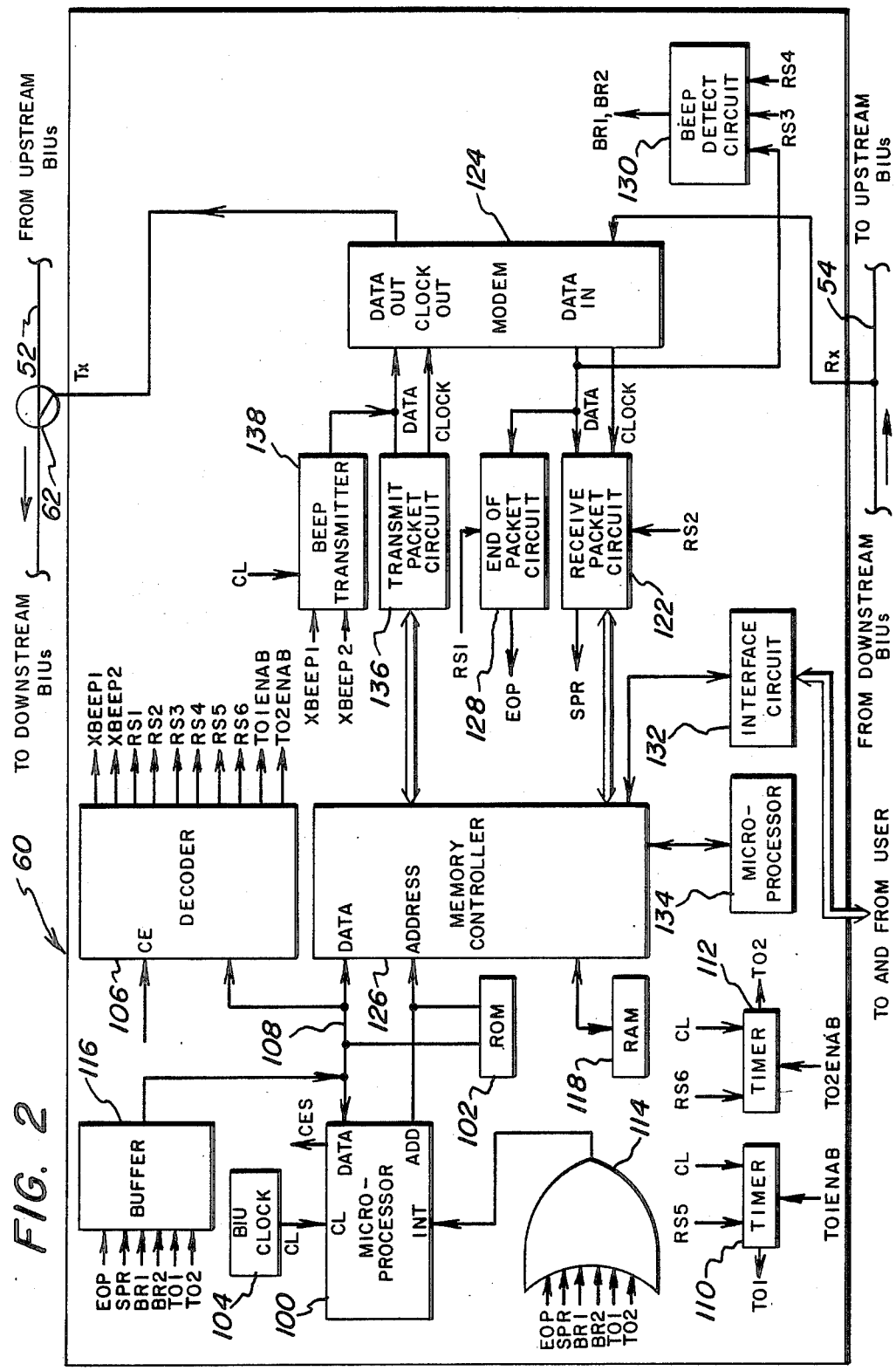
FIG. 2 is a detailed block diagram of the BIU illustrated in FIG. 1.

Having described the bus accessing method of the present invention, preferred elements comprising system 50 are described next. A preferred bus interface unit 60, is illustrated in FIG. 2. Each BIU 60 comprises a microprocessor 100, such as a model Z80 microprocessor manufactured by Zilog, or the like, having a program (illustrated in flow diagrams of FIGS. 4–10) which is stored in a ROM 102 and executed at timing intervals determined by clock signals CL generated by a BIU clock 104.

In controlling the operation of BIU 60 in accordance with the program stored in ROM 102, microprocessor 100 generates command signals XBEEP1, XBEEP2, RS1, RS2, RS3, RS4, RS5, RS6, TO1ENAB and TO2ENAB, the respective functions of these signals being described below. These signals are provided by a decoder 106, a preferred construction of which is described in U.S. Pat. No. 4,517,670 to M. E. Ulug which is commonly assigned and incorporated in its entirety herein by reference. When microprocessor 100 needs to generate a command signal, it places an appropriate address (e.g., 3 bits) on a data bus 108 which couples the microprocessor and decoder 106. The address identifies the specific one of the command signals to be generated. The microprocessor also generates a chip enable signal CES, in a manner well known in the art, which is applied to a chip enable input CE of decoder 106. As a result, the decoder generates the appropriate command signal.

It is necessary for microprocessor 100 to recognize if a packet has been received by BIU 60 (this being indicated by an end of packet signal EOP), if a startup packet has been received by the BIU (this being indicated by a startup packet received signal SPR), if a first or second priority classification beep has been received on bus 54 by the BIU (these being respectively indicated by beep received signals BR1 and BR2), and when a first timer 110 and a second timer 112 have timed out (the timeouts being respectively indicated by signals TO1 and TO2). Timer 110 measures an interval equal in length to twice the signal propagation time between BIU 60 and head-end 56. Thus, for BIU 60-i, timer 110 measures an interval equal to $2T_i$, which is the propagation time for a signal transmitted by the BIU to be received thereby. Timer 112 measures an interval equal to length to 2T, i.e., the beep propagation period.

In order for microprocessor 110 to recognize the state of these signals, each of signals EOP, SPR, BR1, BR2, TO1 and TO2 are applied to respective inputs of an OR-gate 114 and a buffer 116. The output of OR-gate 114 is connected to an interrupt input INT of microprocessor 100. When one of the signals is generated, OR-gate 114 applies an interrupt signal to the microprocessor interrupt input INT. The main program responds to this interrupt signal by completing whatever program step it is presently executing and then performing an interrupt subroutine (FIG. 4) which causes microprocessor 100 to poll buffer 116 to determine the status of the various signals input thereto. At least one of these signals is enabled (at a binary "1" level in the embodiment being considered) indicating the occurrence of its associated event whenever OR-gate 114 generates the interrupt signal. The interrupt subroutine sets a flag indicating the occurrence of an event by placing a binary "1" (or alternately a binary "0", as desired) in a predetermined location in a RAM 118. Throughout this description, reference is made to flags which are set by the program. In each case, specific storage locations in RAM 118 correspond respectively to the indicated flags. Whenever the program resets the flag, it places the opposite logic bit in the respective storage location. After a flag is set in RAM 118, the program causes decoder 106 to generate an appropriate command signal, i.e., RS1-RS6, which is applied to the device which generated the signal that initiated the interrupt subroutine in order to reset that device.

Thus, if the interrupt subroutine is initiated by generation of the EOP signal, the subroutine sets an END OF PACKET flag in RAM 118 and then causes decoder 106 to generate signal RS1. Similarly, the interrupt subroutine sets a STARTUP PACKET RECEIVED flag in response to the SPR signal and causes the decoder to generate signal RS2. In response to signals BR1 or BR2, the subroutine respectively sets either a FIRST PRIORITY BEEP RECEIVED or SECOND PRIORITY BEEP RECEIVED flag and causes decoder 106 to generate signal RS3 or RS4. If the interrupt subroutine is initiated by timeout signals TO1 or TO2, the subroutine respectively sets a TIMER TO1 flag or TIMER TO2 flag in RAM 118 and then causes the decoder to generate signal RS5 or RS6.

Each BIU in system 50 operates in a promiscuous mode in which it receives all signals on receive bus 54. When any startup or information packet is received on receive port $R_x$, it is transferred to a temporary buffer section of RAM 118 via a modem 124, receive packet circuit 122 and a memory controller 126. Transfer of information into RAM 118 is controlled automatically by memory controller 126 and receive packet circuit 122 and does not require supervision by microprocessor 100. The manner in which a packet is transferred from modem 124 to RAM 118 is described in U.S. Pat. No. 4,464,749 to M. E. Ulug which is commonly assigned and incorporated in its entirety herein by reference, and hence is not described in detail herein.

A preferred construction of the receive packet circuit is as described in the above-incorporated U.S. Pat. No. 4,517,670. The circuit is adapted to decode the header portion of a received information packet and decide whether the packet is addressed to the respective BIU, i.e., intended for receipt by a user terminal connected to the BIU. In addition to this preferred construction, receive packet circuit 122 also includes means for determining if a packet being received is a startup packet and, if so, generating the SPR signal. In order to determine if the received packet is a startup packet, the receive packet circuit preferably includes one or more registers and means for performing an exclusive-OR logic operation. The received packet header portion is shifted into a register, while the pattern of the startup header portion is permanently stored, or "hardwired" in the circuit. The received header in the register is "exclusive-ORed" with the permanent header pattern. If the received header matches the pattern, the logic means provides an output consisting entirely of '0's. Circuit 126 further includes means for sensing this result and generating the SPR signal.

BIU 60 further includes an end-of-packet circuit 128 which monitors a DATA IN output of modem 124 and generates the EOP signal when an entire information or startup packet has been received. A preferred construction of the end-of-packet circuit is as described in the above-incorporated U.S. Pat. No. 4,517,670.

BIU 60 additionally includes a beep detect circuit 130, coupled to the DATA IN output of modem 124 in order to monitor receive bus 54, which generates a signal BR1 or BR2 when a first or second priority classification beep, respectively, is detected. The beep detect circuit may be constructed from one or more registers and means for performing an exclusive-OR logic operation. The received beep is shifted into a register. The patterns of first and second priority beeps are permanently stored, or "hardwired" in the circuit. The received beep in the register is "exclusive-ORed" with one or the other of the permanent beep patterns. If the received beep matches the pattern, the logic means provides an output consisting entirely of '0's. The beep detector further includes means for sensing this result and generating the appropriate signal BR1 or BR2.

Information messages are periodically provided by user terminal 58 to the BIU for transmission on transmit bus 52. User terminal 58 is coupled to RAM 118 through an interface circuit 132 and memory controller 126. Interface 132 comprises shift registers (not shown) and buffers (not shown) as is known in the art. A microprocessor 134 (which may be of the same type as is microprocessor 100) has embedded therein (or in an associated ROM (not shown)) a program which stores messages received from user terminal 58 for transmission, in RAM 118 via interface circuit 132 and memory controller 126, forms information packets from these messages and stores the formed information packets in RAM 118. Likewise, microprocessor 134 accepts information packets from RAM 118, through memory controller 126, which are addressed to the user terminal and formats them for transfer thereto via the memory controller and interface circuit. If the packet to be transmitted is a first priority packet, a FIRST PRIORITY PACKET TO TRANSMIT flag is set in RAM 118. When either a first or second priority packet is placed into RAM 118 from an associated user terminal, a PACKET TO TRANSMIT flag is set.

When the program determines that BIU 60 has an information packet to transmit and that the BIU is permitted access to transmit bus 52, the program directs that the packet be transferred from RAM 118 to transmit port $T_x$ via memory controller 126, a transmit packet circuit 136 and modem 124. The manner in which information packets are transferred from RAM 118 to transmit bus 54 is described in the above incorporated U.S. Pat. No. 4,464,749. A preferred construction of the transmit packet circuit is as described in the above-incorporated U.S. Pat. No. 4,517,670.

As discussed above, the BIU, upon receiving the end of the startup packet, transmits a beep if it is in the transmit state. Thus, the microprocessor, upon determining that the SPR and EOP signals have both been generated, causes the decoder to generate either an XBEEP1 or XBEEP2 beep transmit signal which is applied to a beep transmitter 138. The XBEEP1 and XBEEP2 command signals respectively cause the beep transmitter to transmit either a first priority classification or second priority classification beep. Beep transmitter 138 may simply comprise registers for storing the desired beep patterns and means, responsive to command signals XBEEP1 and XBEEP2, for shifting the appropriate beep pattern from register storage onto the DATA OUT input of modem 124. Note that the desired beep patterns may be stored in ROM 102. Then, upon initial operation of the BIU, the patterns are transferred from the ROM into the beep transmitter registers.

Upon the end of the startup packet being received, the program on which microprocessor 100 operates also causes generation of two timer enable signals TO1ENAB and TO2ENAB which are respectively applied to timers 110 and 112 to initiate their operation. When timers 110 and 112 time out and respectively generate signals TO1 and TO2, the interrupt subroutine responds by setting the TIMER TO1 and TIMER TO2 flags and generating signals RS5 and RS6 for application to timers 110 and 112. Signals RS5 and RS6 are respectively effective to reset timers 110 and 112.

Figure 3:
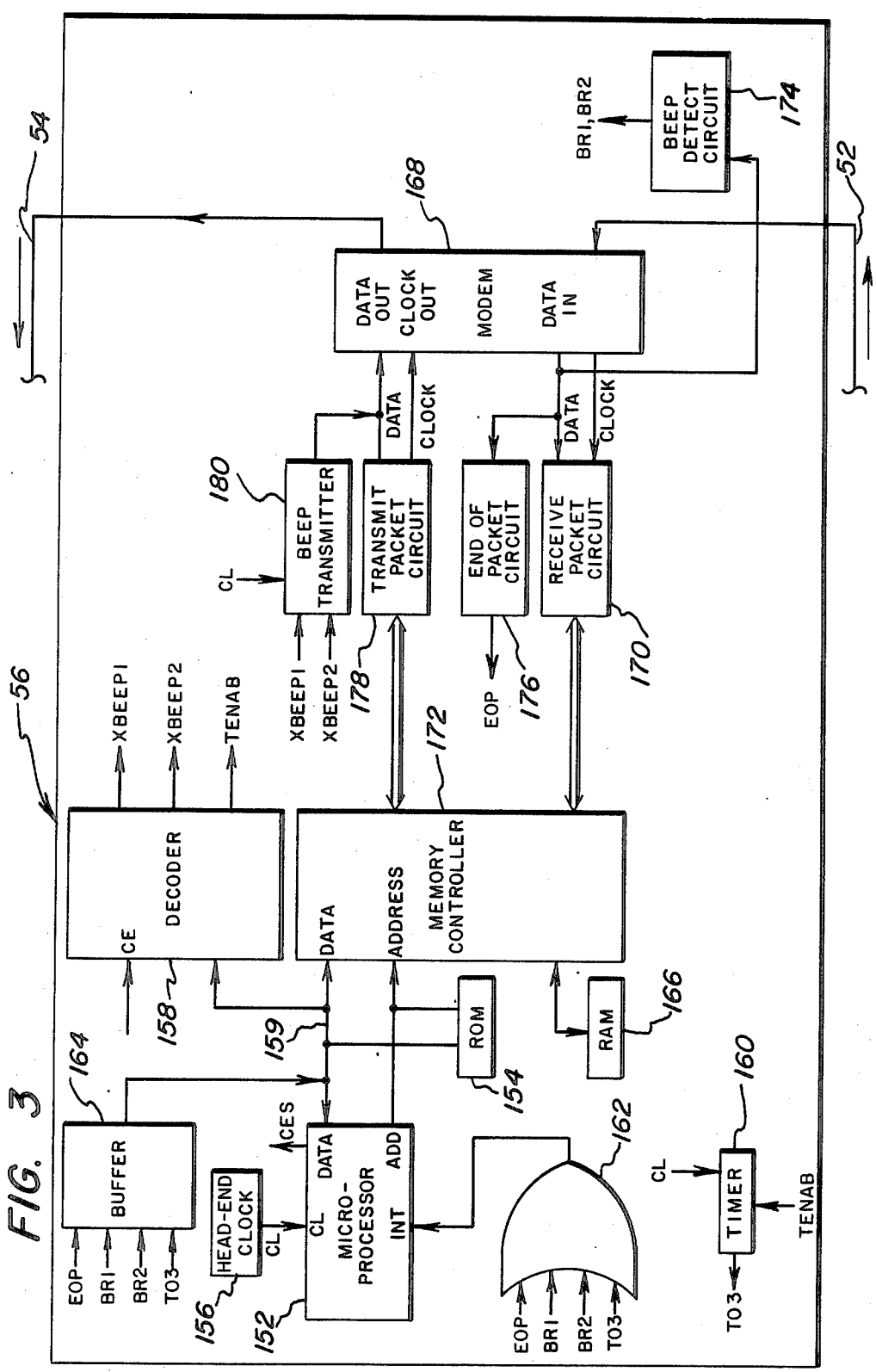
FIG. 3 is a detailed block diagram of the intelligent head-end illustrated in FIG. 1.

Having described the preferred BIU with which the present invention may be practiced, a preferred intelligent head-end 56 is described next. Head-end 56 illustrated in FIG. 3, is coupled to receive signals from transmit bus 52 and retransmit those signals, or transmit a startup packet, on receive bus 54. Head-end 56 comprises substantially the same elements performing substantially the same functions as disclosed with respect to BIU 60. Further, the preferred construction disclosed for each of various elements of BIU 60 is equally applicable for each such element also included in the head-end. Thus, head-end 56 includes a microprocessor 152 which operates on a program, stored in a ROM 154, executed at timing intervals determined by clock signals CL generated by a head-end clock 156. Microprocessor 152, ROM 154 and clock 156 are substantially the same as provided for BIU 60.

In controlling operation of the head-end, microprocessor 152 generates command signals XBEEP1, XBEEP2 and TENAB, and a plurality of signals, not shown, for resetting devices. The signals are provided by a decoder 158, coupled to the microprocessor by a data bus 159, in substantially the same manner as described with respect to BIU 60.

It is necessary for the head-end to recognize when an information packet has been received from transmit bus 52 (this being indicated by an end of packet signal EOP), if a first or second priority classification beep has been received from the transmit bus (these occurrences being respectively indicated by beep received signals BR1 and BR2) and if a timer 160 which, upon receipt thereby of the TENAB command signal, measures the beep propagation period 2T, has timed out (the timeout being indicated by a signal TO3 generated by timer 160).

Microprocessor 152 is enabled to recognize the occurrence of any of these signals by their application to an OR-gate 162 and a buffer 164, the OR-gate being connected to an interrupt input INT of the microprocessor. Generation of a signal causes the OR-gate to apply an interrupt signal to the INT input, the main program responding to the signal generally in the manner described with respect to BIU 60. An interrupt subroutine for the head-end microprocessor sets flags, not shown, in a RAM 166, and generates command signals, not shown, to reset the devices which initiated the interrupt subroutine.

In the manner described with respect to BIU 60, information packets received by the head-end are transferred to a temporary buffer section of RAM 166 via a modem 168, a receive packet circuit 170 and a memory controller 172. The preferred construction of the receive packet circuit is as described with respect to BIU 60, though it need not generate a startup packet received (SPR) signal in the head-end.

Head-end 56 further comprises a beep detect circuit 174 constructed as described with respect to BIU 60, coupled to the DATA IN output of modem 168 and which generates beep received signals BR1 and BR2 upon receipt by the head-end of either a first or second priority classification beep, respectively.

The head-end additionally includes an end-ofpacket circuit 176, constructed as described for BIU 60, which generates the EOP signal upon the head-end receiving an entire information packet.

In order to retransmit information packets received from the transmit bus, the program in ROM 154 directs the packet to be transferred from the temporary buffer section of RAM 166 to receive bus 54 via memory controller 172, a transmit packet circuit 178 and modem 168. The preferred construction of the transmit packet circuit and the manner of packet transfer is substantially as described with respect to BIU 60. Obviously, in retransmitting packets on the receive bus, the head-end has immediate access to that bus. This is to be distinguished from the BIUs which must first gain access to the transmit bus, in the manner described above, in order to transmit a packet.

In order to retransmit beeps received on transmit bus 52, the head-end includes a beep transmitter 180, constructed substantially the same as that described for BIU 60. Beep transmitter 180 is responsive to command signals XBEEP1 and XBEEP2 to respectively generate first priority and second priority beeps which are applied to a DATA OUT input of modem 168. The program causes generation of the XBEEP1 or XBEEP2 command signals respectively upon receipt by the microprocessor of the BR1 or BR2 signal.

As discussed above, the head-end periodically transmits a startup packet on receive bus 54. In order to determine when to transmit the startup packet, the head-end must keep track of the number of beeps and information packets transmitted by the BIUs. Upon transmission of a startup packet by the head-end, microprocessor 152 causes generation of the TENAB command signal which initiates timer 160. Since the timer measures a period equal to 2T, the head-end will have received all beeps generated by BIUs, when timer 160 times out and generates the TO3 signal. For each beep received by the head-end, the BR1 or BR2 signal is generated. Microprocessor 152 counts the number of such signals generated within the 2T time period. Subsequent to this time period, as discussed above, the BIUs commence generation of information packets which the head-end receives and retransmits on the receive bus. For each information packet received, the EOP signal is generated by end-of-packet circuit 176. Microprocessor 152 counts the number of EOP signals generated and when this number is equal to the number of beeps received, it determines that a new startup packet can be transmitted.

The form of the left and right startup packets are preferably initially stored in ROM 154 and then transferred to RAM 166 where they remain during operation of communication system 50. In order to transmit a left or right sweep startup packet, the appropriate packet is copied and then transferred out of RAM 166 by the memory controller for transmission on receive bus 54 via transmit packet circuit 178 and modem 168.

Figure 4:
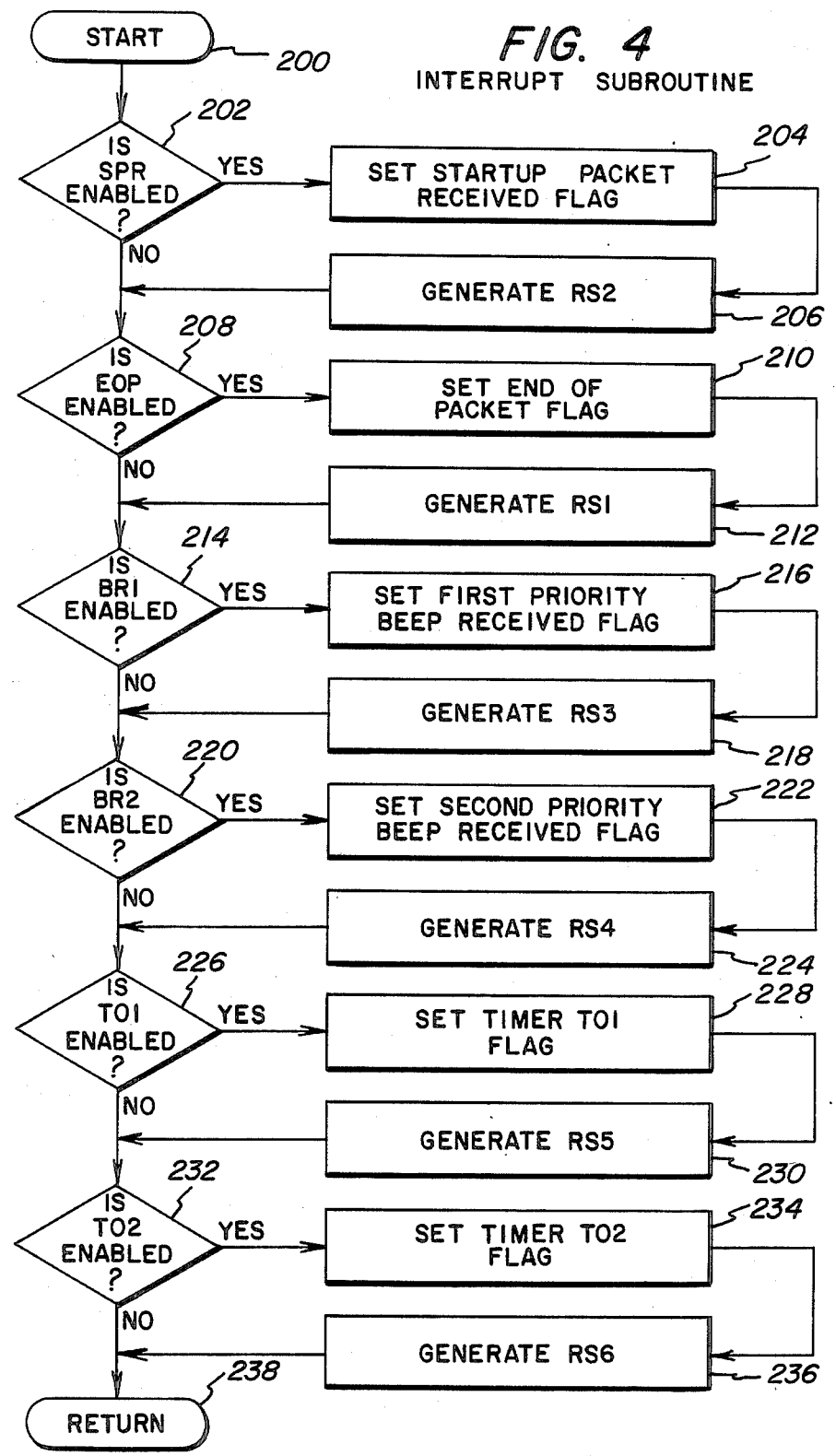
FIGS. 4-10 are flow diagrams generally illustrating the program executed by a microprocessor in FIG. 2 and in FIG. 13.

Having described in detail the construction of BIU 60 and head-end 56, the operation of the BIU will now be described. The various components of BIU 60 operate in accordance with the program stored in ROM 102, as illustrated in the flow diagrams of FIGS. 4–10. As discussed above, microprocessor 100 responds to interrupt signals on its INT input by executing an interrupt subroutine wherein it polls buffer 116, sets flags in RAM 118 and generates command signals RS1-RS6. Referring to FIG. 4, upon receiving an interrupt signal, the microprocessor completes the program instruction it is executing, immediately jumps to a start interrupt subroutine step 200 and begins sequentially polling the inputs of buffer 116 to determine which input signal is enabled and thereby which event has occurred. At step 202, the subroutine determines if the startup packet received signal SPR is enabled, and, if so, performs step 204 by setting the STARTUP PACKET RECEIVED flag in RAM 118. Then step 206 is performed to generate signal RS2 which is applied to receive packet circuit 122 in order to reset that circuit. If the SPR signal was not enabled, or if step 206 was performed, the subroutine proceeds to step 208 wherein it is determined whether the end of packet signal EOP is enabled. If the EOP signal is enabled, step 210 is performed in which the END OF PACKET flag is set and then step 212 is performed in which signal RS1 is generated and applied to end-of-packet circuit 128 in order to reset that circuit. If the EOP signal was not enabled, or if step 212 was performed, the subroutine proceeds to step 214.

At step 214, it is determined whether the first priority beep received signal BR1 is enabled and if enabled, step 216 is performed in which the FIRST PRIORITY BEEP RECEIVED flag is set. Then, at step 218, signal RS3 is generated and applied to beep detect circuit 130 to reset that circuit. If the BR1 signal was not enabled, or if step 218 was performed, the subroutine proceeds to step 220 in which it is determined whether the second priority beep received signal BR2 is enabled and, if so, at step 222 the SECOND PRIORITY BEEP RECEIVED flag is set. Then, at step 224, signal RS4 is generated and applied to beep detector circuit 130 to reset it. If the BR2 signal was not enabled or if step 224 was performed, the subroutine proceeds to step 226 where it is determined if the timer 110 timeout signal TO1 is enabled. If enabled, the TIMER TO1 flag is set at step 228 and signal RS5 is generated and applied to timer 110 at step 230. If the TO1 signal was not enabled or if step 230 was performed, step 232 is performed in which it is determined if the timer 112 timeout signal TO2 is enabled. If enabled, the TIMER TO2 flag is set at step 234. Then, at step 236, signal RS6 is generated and applied to timer 112. If signal TO2 was not enabled or step 236 was performed, step 238 is performed to return to the step in the main program after the step the main program finished executing before entering the interrupt subroutine.

Figure 5:
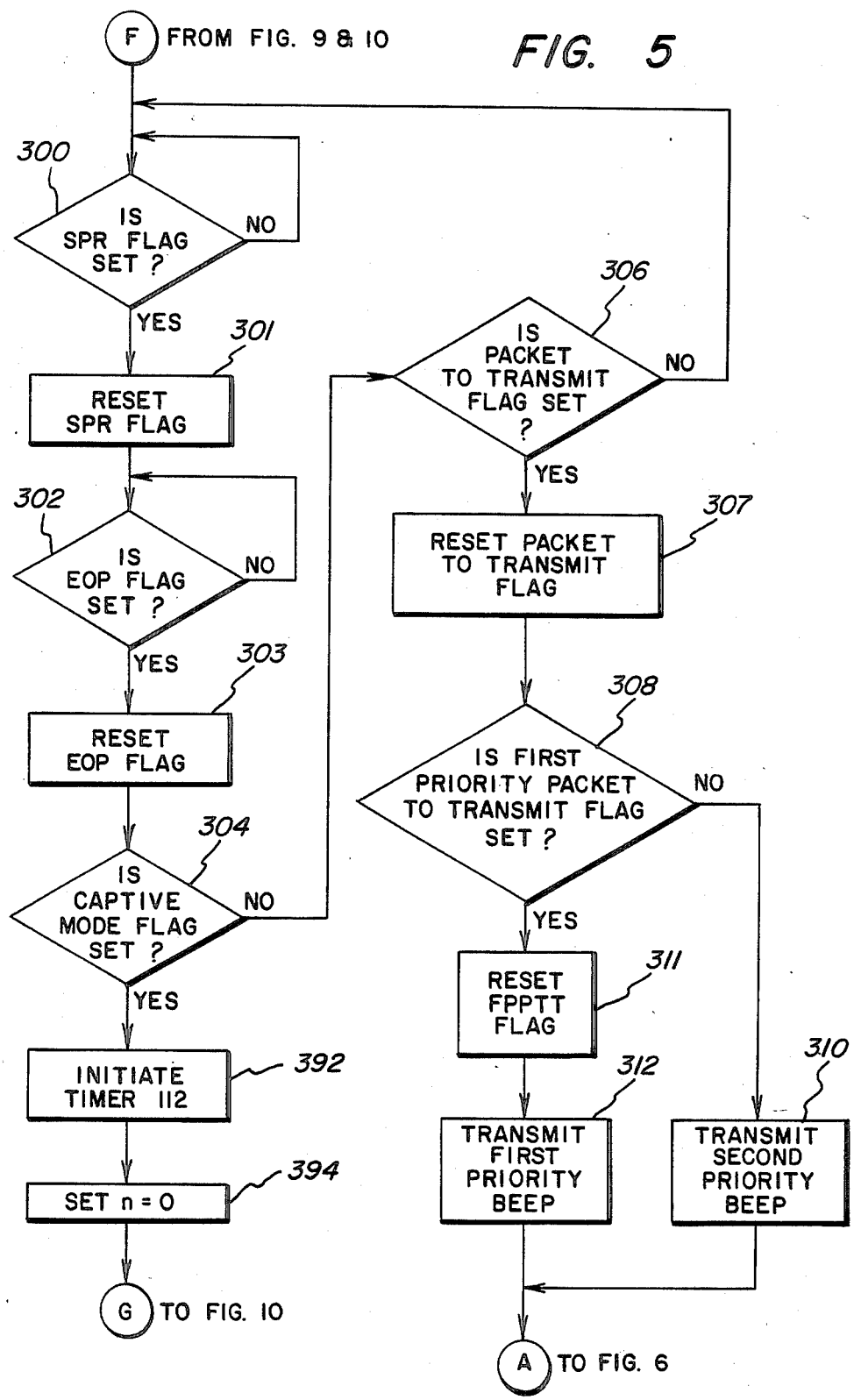

The main program by which microprocessor 100 operates is illustrated in FIGS. 5-10 and, referring to FIG. 5, commences with an initial step 300 in which the program determines whether the STARTUP PACKET RECEIVED (SPR) flag is set. The program does not proceed to the next step until the SPR flag is set. If the SPR flag is set, it is reset at step 301 and the program proceeds to step 302 in which it determines if the END OF PACKET (EOP) flag is set and if it is not set the program waits until it is set. If the EOP flag is set at step 302, indicating that the end of the startup packet has been received, the flag is reset at step 303 and the program proceeds to step 304 in which it determines if a CAPTIVE MODE flag is set indicating that the BIU is in the captive mode. If the CAPTIVE MODE flag is not set, the program proceeds to step 306 in which it determines if the PACKET TO TRANSMIT flag is set. If the PACKET TO TRANSMIT flag is not set, then the BIU has no information packet to transmit and returns to the initial step 300. If the PACKET TO TRANSMIT flag is set, however, the program resets the flag (step 307) and next determines at step 308 if the FIRST PRIORITY PACKET TO TRANSMIT (FPPTT) flag is set. If the flag is not set, this indicates that the BIU has a second priority classification information packet to transmit and the program proceeds to step 310 which causes the BIU to transmit a second priority beep by directing decoder 106 to generate the beep transmit signal XBEEP2. If the FPPTT flag is set, indicating that the information packet to transmit has a first priority classification, the flag is reset (step 311) and step 312 is executed causing the decoder to generate the XBEEP1 signal. As previous discussed, the XBEEP1 and XBEEP2 signals are applied to beep transmitter 138 in order to transmit the appropriate priority beep on transmit bus 52.

Figure 6:
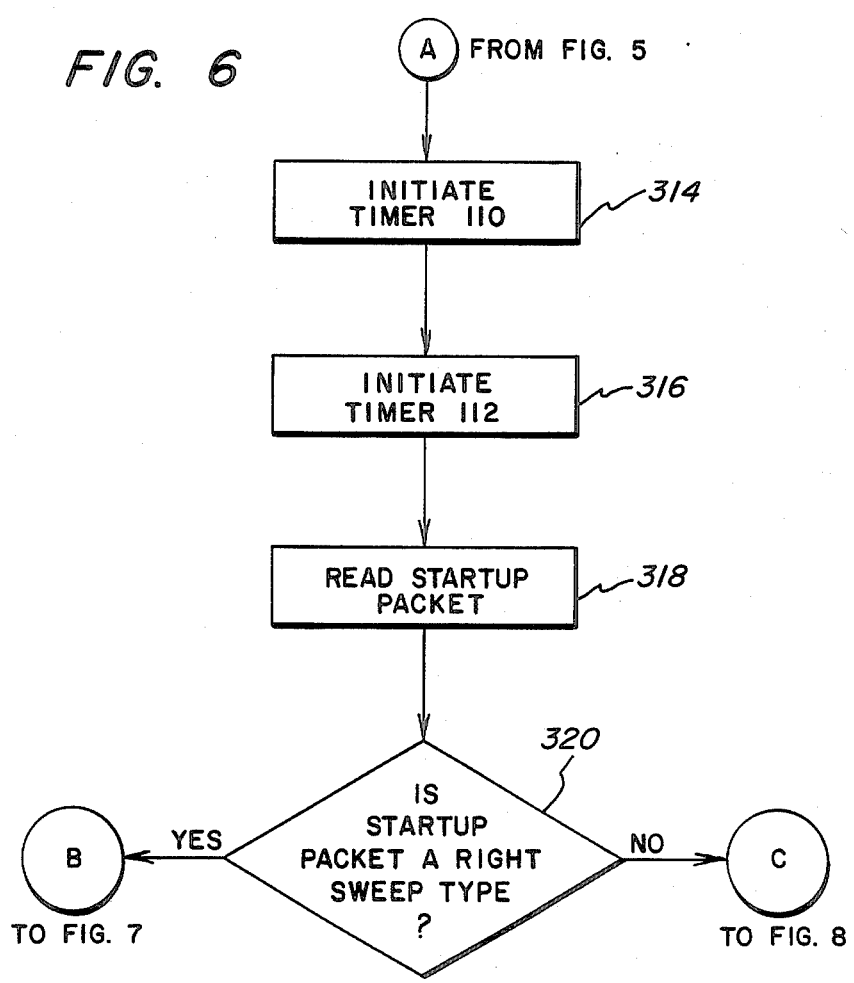
Figure 7:
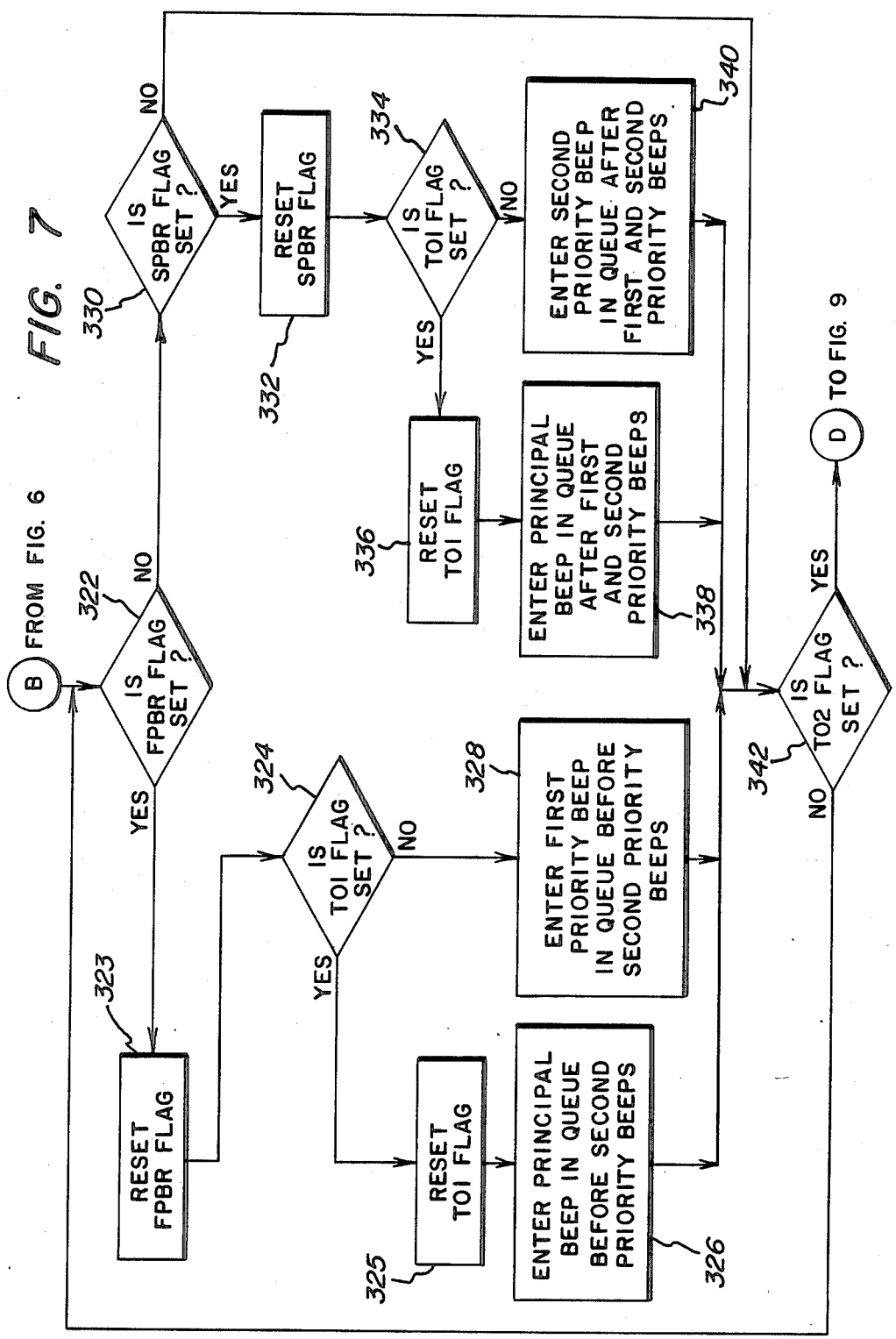

Following performing either steps 310 and 312, the program, referring now to FIG. 6, performs step 314 in which it initiates operation of timer 110. This is accomplished by causing decoder 106 to generate the TO1ENAB command signal. The program then proceeds to step 316 wherein operation of timer 112 is initiated, this being accomplished by causing decoder 106 to generate the TO2ENAB command signal. The program then proceeds to step 318 in which it reads the startup packet which will have been stored in RAM 118 at a predetermined address location. Having read the startup packet, the program is able to determine at step 320, whether the packet is a left sweep or right sweep type and, referring to FIG. 7, if it is a right sweep type proceeds to step 322. At step 322 the program determines if the FIRST PRIORITY BEEP RECEIVED (FPBR) flag has been set to indicate receipt of such a beep. If the FPBR flag is set, it is reset at step 323 and the program proceeds to step 324 in which it determines if the TIMER TO1 (TO1) flag is set indicating that timer 110 has timed out. If the TO1 flag is set, this indicates that the first priority beep that has been received was the beep generated by the particular BIU and is hence the principal beep. If this is the case, the TO1 flag is reset at step 325 and the program proceeds to step 326 in which the principal beep is entered in the queue ahead of all second priority beeps but behind first priority beeps already received. If the TO1 flag is not set, then the first priority beep that was received is not the principal beep and the beep is entered in the queue as a first priority beep ahead of all second priority beeps, and behind the already received first priority beeps at step 328.

If the FPBR flag is not set, the program proceeds to step 330 in which it determines if the SECOND PRIORITY BEEP RECEIVED (SPBR) flag is set indicating receipt of a second priority beep. If the SPBR flag has been set, the program proceeds to step 332 in which it resets that flag and then proceeds to step 334 in which it determines if the TO1 flag is set. If the TO1 flag is set, indicating that the principal beep has been received and it is a second priority beep, the program proceeds to step 336 where the TO1 flag is reset and then to step 338 where the principal beep is entered into the queue after all first priority beeps and the second priority beeps received up to that time. If, at step 334, it is determined that the TO1 flag is not set indicating that the second priority beep received was not the principal beep, the program proceeds to step 340 where the second priority beep is entered in the queue after the first and second priority beeps already in the queue. Following completion of step 326, 328, 338 or 340 or if the SPBR flag was not set, the program proceeds to step 342 where it determines if the TIMER TO2 (TO2) flag is set indicating that timer 112 has timed out. If timer 112 has not timed out, then further beeps may be received and the program returns to step 322.

Figure 8:
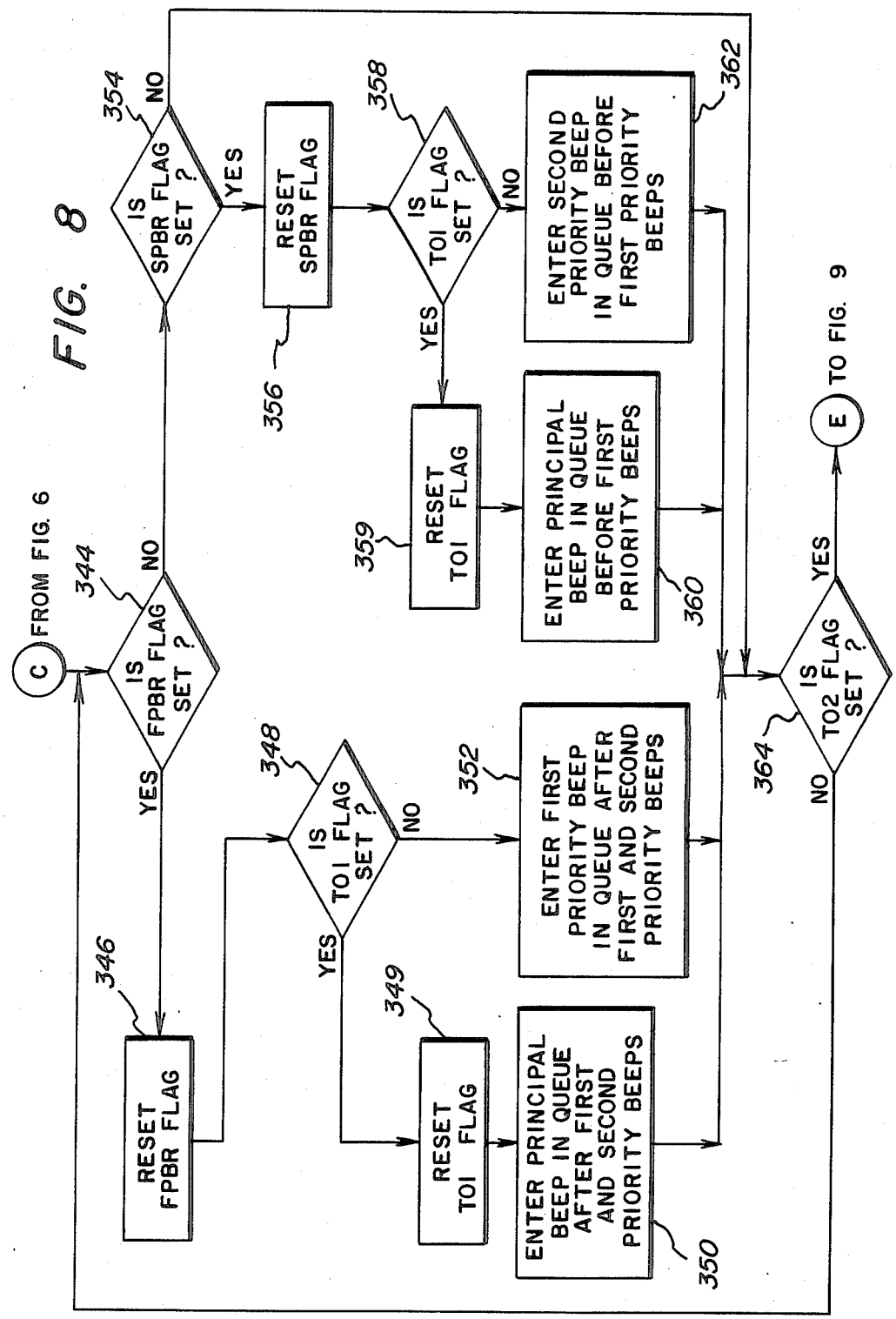
Figure 9:
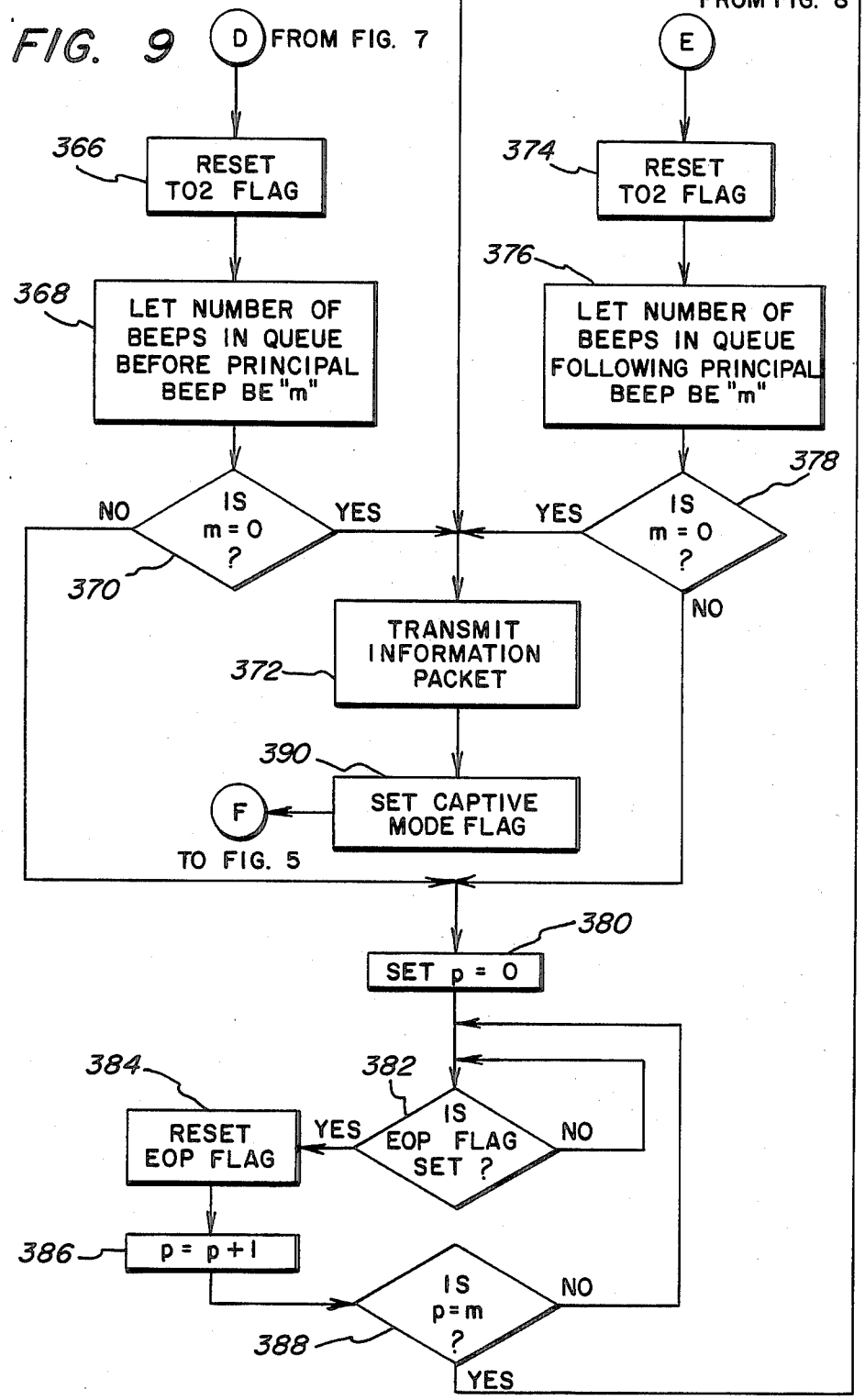

Referring again to step 320 (FIG. 6), if the startup packet was not a right sweep type, then it was a left sweep type and the program proceeds to step 344, at FIG. 8. At step 344, the program determines if the FPBR flag is set indicating receipt of a first priority beep. If the flag is set, the program proceeds to step 346 where the FPBR flag is reset. The program then proceeds to step 348 where it determines if the TO1 flag is set. If the TO1 flag is set, indicating that the first priority beep received is the principal beep, it is reset (step 349) and the program proceeds to step 350 where the principal beep is entered in the queue after all first and second priority beeps so far received, as is appropriate following a left sweep startup packet. If, at step 348, it is determined that the TO1 flag is not set, indicating that the first priority beep received was not the principal beep, the program proceeds to step 352 where the first priority beep is entered in the queue after the already received first and second priority beeps. If at step 344 it was determined that the FPBR flag was not set, the program proceeds to step 354 where it determines if the SPBR flag is set, indicating that a second priority beep has been received. If the SPBR flag is set, the program proceeds to step 356 where that flag is reset and then to step 358 where it determines if the TO1 flag is set. If, at step 358, it is determined that TO1 flag is set, indicating that the second priority beep received is the principal beep, the program resets the TO1 flag (step 359) and proceeds to step 360 where it enters the principal beep in the queue before all first priority beeps but after all second priority beeps so far received. If, instead, at step 358 it is determined that the TO1 flag is not set, the program proceeds to step 362 where the second priority beep is entered in the queue before the first priority beeps.

Following completion of step 350, 352, 360 or 362 or if, at step 354, it was determined that the SPBR flag was not set, the program proceeds to step 364 where it determines if the TO2 flag is set. If the TO2 flag is not set, the program returns to step 344 since additional beeps may be received. Referring again to step 342 (FIG. 7), following the right sweep startup packet, if it is determined that the TO2 flag is set, indicating the end of the beep propagation period, the program proceeds, referring to FIG. 9, to step 366 where the TO2 flag is reset. The program then proceeds to step 368 where the number of beeps, in the queue, preceding the principal beep are counted and that number of beeps is set equal to m. The program then proceeds to step 370 where it determines if m is equal to 0. If m is equal to 0, then the BIU has a first transmission ranking and the program proceeds to step 372 where transmission of the information packet is commenced.

Referring again to step 364 (FIG. 8), following the left sweep startup packet, if the TO2 flag is set, indicating the end of the beep propagation period, the program proceeds to step 374 (FIG. 9) where the TO2 flag is reset. Next, step 376 is performed in which the number of beeps in the queue following the principal beep is counted and set equal to m. Then at step 378, it is determined whether m is equal to 0. If m is equal to 0, then the BIU has a first transmission ranking and the program proceeds to step 372 where transmission of the information packet is commenced.

Referring again to steps 370 and 378, if m is not equal to 0, then the value of m is equal to the number of information packets which must be transmitted by other BIUs before the particular BIU can transmit its information packet. It is, therefore, necessary to count the number of information packets transmitted by the other BIUs. To this end, the program proceeds to step 380 where a parameter p, used to count the information packets transmitted by the other BIUs, is initialized at zero. The program then proceeds to step 382 where it determines if the EOP flag is set. If the EOP flag is set, indicating that an information packet has been received, the program proceeds to step 384 where the EOP flag is reset and then to step 386 where the program increments the value of p by one. Having incremented the value of p, the program proceeds to step 388 where it tests the value of p against the value of m. If p=m, indicating that it is the particular BIU's turn to transmit its information packet, the program returns to step 372 and commences information packet transmission. If p does not equal m, the program returns to step 382. Note also that the program remains at step 382 until the EOP flag is set.

Figure 10:
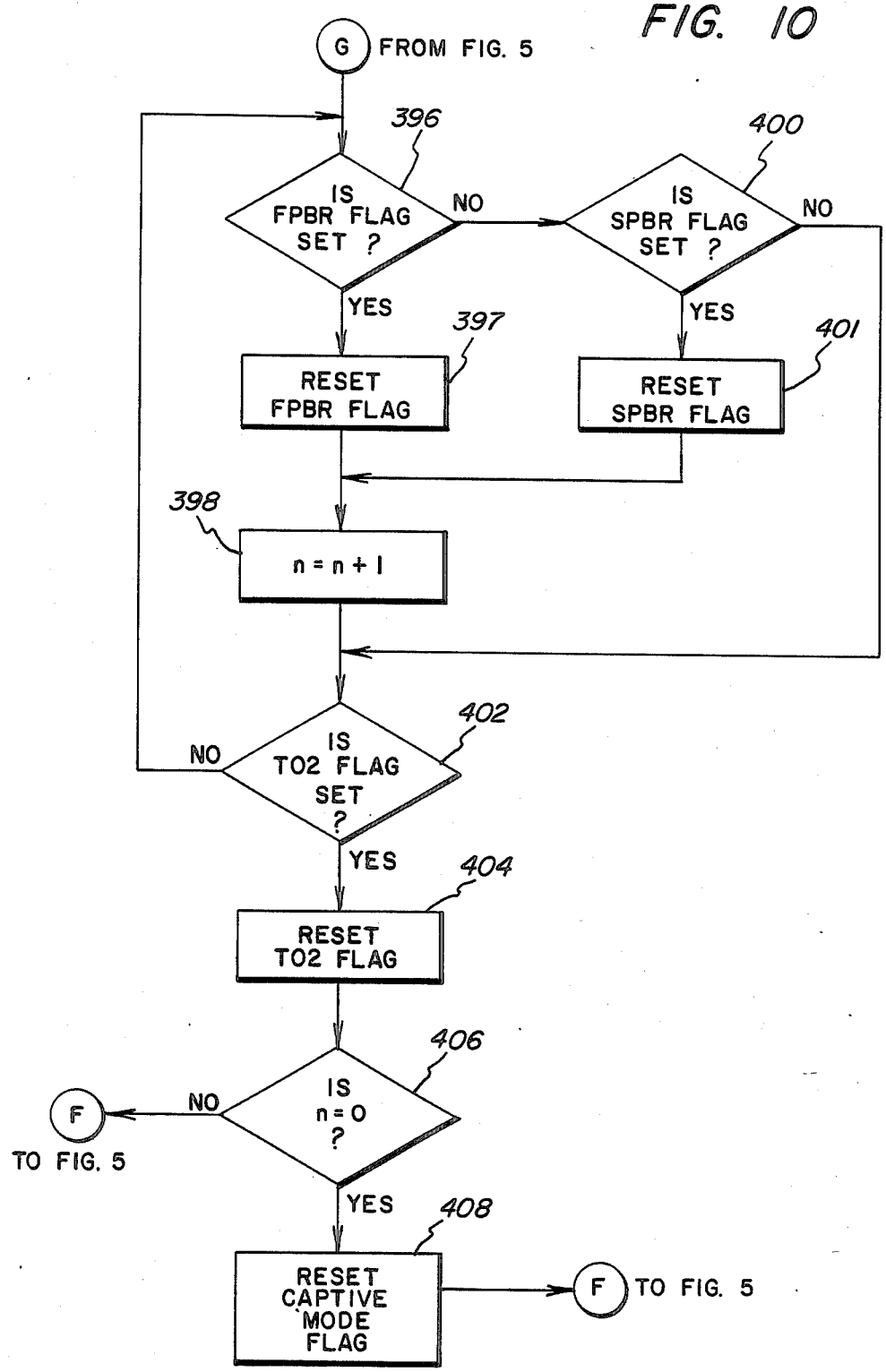

Following transmission of an information packet, the BIU enters the CAPTIVE MODE and so, following step 372, the program performs step 390 wherein the CAPTIVE MODE flag is set in RAM 118. Following step 390, the program returns to step 300 (FIG. 5) to wait for the next startup packet. As previously discussed, the BIU refrains from transmitting beeps and information packets until a beep propagation period occurs in which no beeps are transmitted by any BIUs. Referring to step 304, if, following receipt of the end of a startup packet, it is determined that the CAPTIVE MODE flag is set, the program initiates operation of timer 112, at step 392. The program then proceeds to step 394 where it initializes at zero a beep count parameter n. Referring to FIG. 10, the program next determines, at step 396, if the FPBR flag is set, indicating that a first priority classification beep has been received and, if so, the flag is reset at step 397. Then, the program proceeds to step 398 where the value of n is incremented by one. If at step 396, the program determines that the FPBR flag is not set, it proceeds to step 400 where it determines if the SPBR flag is set, indicating that a second priority classification beep has been received. If such a beep has been received, the SPBR flag is reset (Step 401) and the program proceeds to step 398. If such a beep has not been received indicating that no beep has been received, or after performing step 398, the program proceeds to step 402 where it determines if the TO2 flag is set, indicating that the beep propagation period has ended. If the beep propagation period has not ended, the program returns to step 396. However, if the beep propagation period has ended, the program proceeds to step 404 where the TO2 flag is reset and then to step 406 where the program determines if n equals 0. If n does not equal 0 indicating that beeps were transmitted during the beep propagation period, the program returns to step 300 (FIG. 5). If, however, n equals 0, the program proceeds to step 408 where the CAPTIVE MODE flag is reset and then the program returns to step 300 (FIG. 5).

Figure 11:
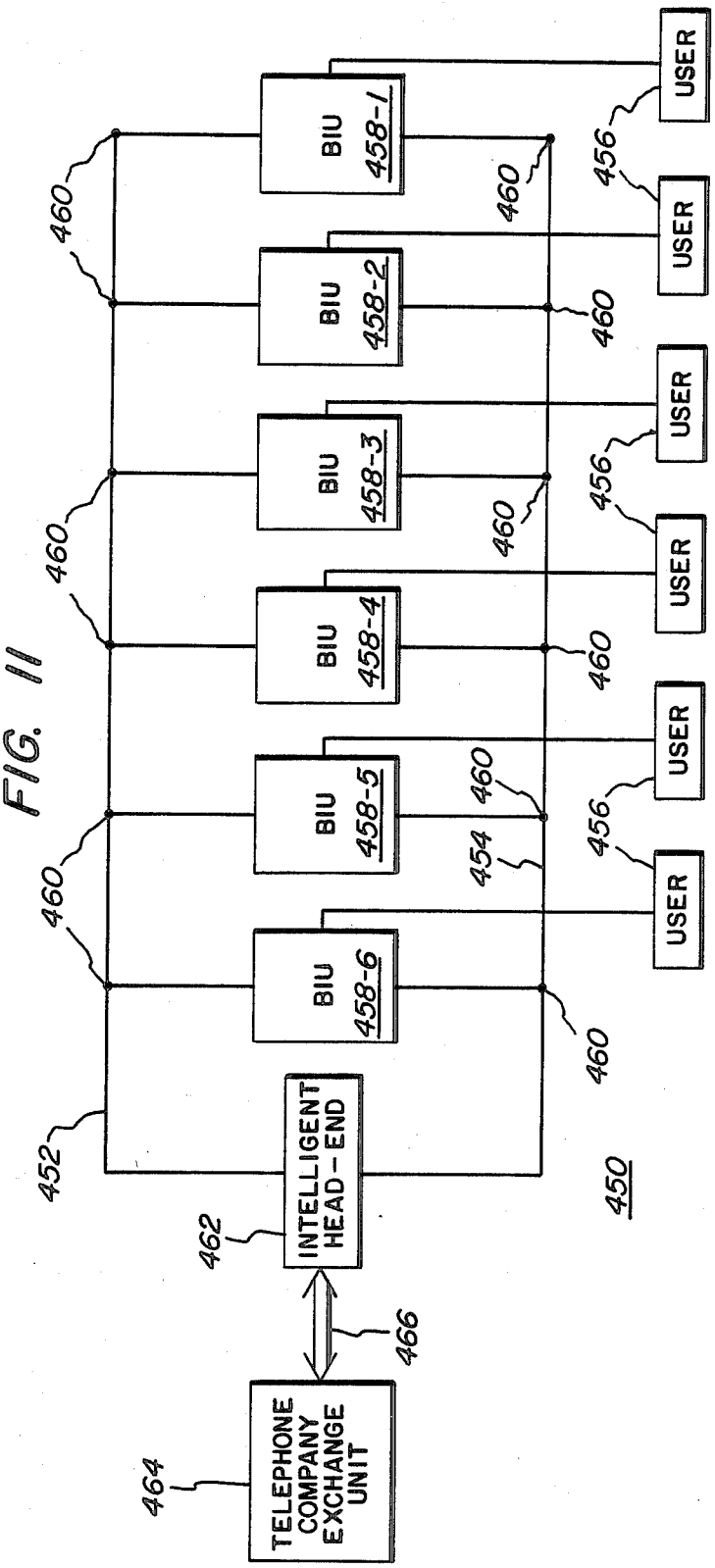
FIG. 11 is a block diagram of a communication system constructed in accordance with an alternate embodiment of the present invention.

An alternate embodiment of the present invention is illustrated in FIG. 11 and comprises a communication system 450 primarily adapted for the communication of voice encoded signals. System 450 is configured substantially the same as system 50 and includes a fiber optic transmit bus 452 and a fiber optic receive bus 454. A plurality of user terminals 456 are connected to buses 452 and 454 via a plurality of BIUs 458-1, 458-2, 458-3, 458-4, 458-5 and 458-6. The BIUs are connected to buses 452 and 454 by fiber optic passive couplers 460, commercially available as described above with respect to system 50. System 450 further includes an intelligent head-end 462 connected between buses 452 and 454. Since system 450 is specially adapted for communicating voice encoded signals, head-end 462 is diagrammatically shown as coupled to a telephone company exchange unit 464 via telephone system trunk lines 466. In order to maximize utilization of the transmission media of system 450, as well as minimize user to user delay variance, the signals communicated between the BIUs are time division multiplexed. Time division multiplexing is a technique, well known in the art, for multichannel transmission of digital signals, and is generally described in "Information Transmission, Modulation, and Noise", by M. Schwartz, pp. 131–163, Second Edition, published by McGraw-Hill, 1959, incorporated herein by reference. In the alternate embodiment, each BIU in the communication system is assigned to one of a plurality of time intervals each corresponding to a channel during which it can transmit and receive signals. Other BIUs in the communication system may be assigned the same or different channels. For example, the time division multiplexed system may have 10 channels, with the channels occurring in a sequence repeated every 10 nanoseconds. In such a system, each BIU only transmits and/or receives a one byte signal during the time interval corresponding to its channel. Thus, information packets are transmitted and received in one byte portions. Other time division multiplexed systems known in the art, that may be practiced with the present invention, have different numbers of channels, different bit rates and may enable more or less than one byte to be transmitted or received during the channel time interval. By time division multiplexing the signals on system 450, the number of BIUs that may be connected thereto is greatly increased and so utilization of the transmission medium is correspondingly increased.

Figure 12:
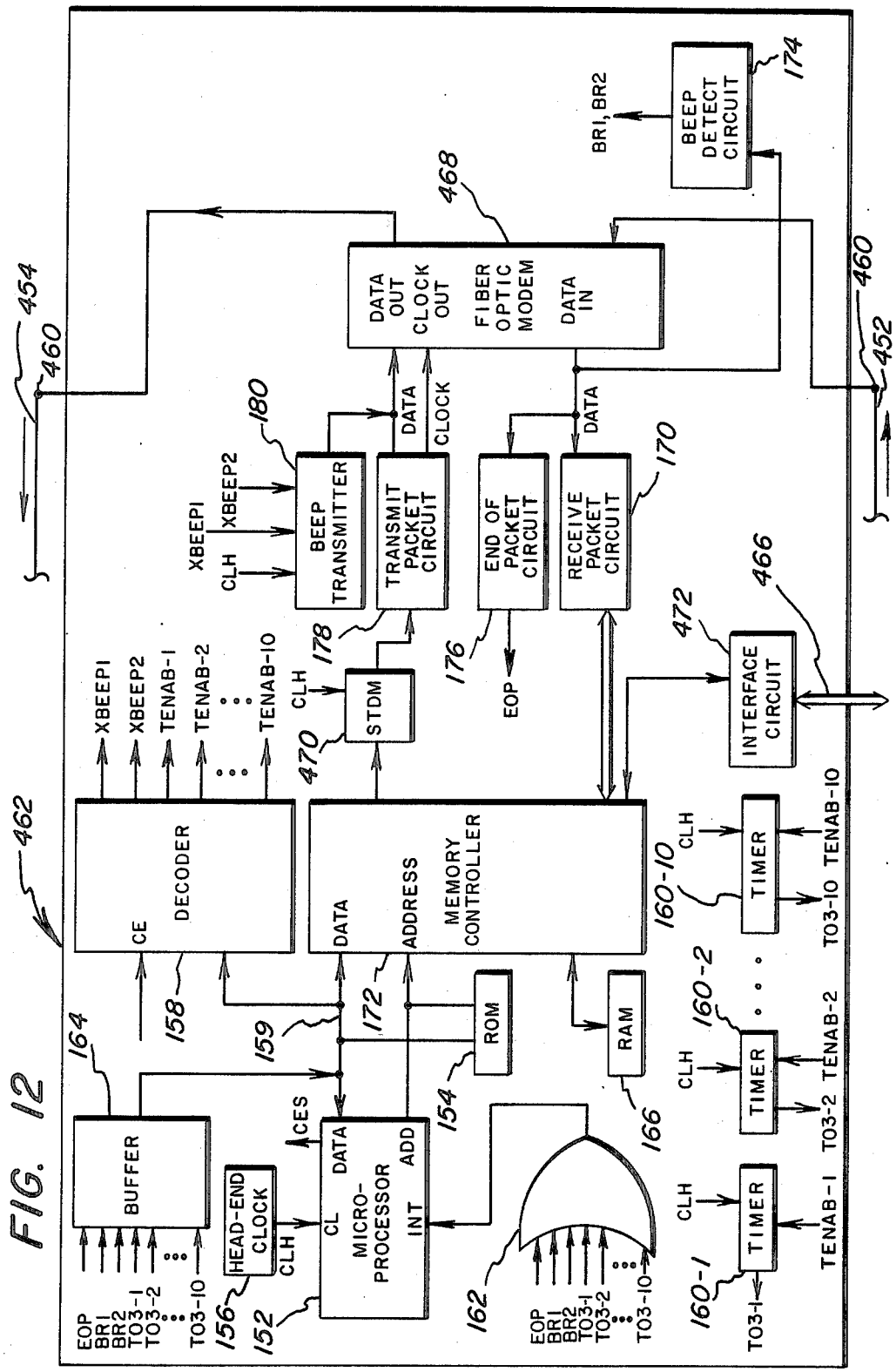
FIG. 12 is a detailed block diagram of an intelligent head-end constructed in accordance with the alternate embodiment of the present invention.

In the alternate embodiment, head-end 462, illustrated in FIG. 12, is coupled to buses 452 and 454 via passive couplers 460. Head-end 462 is configured substantially identically to head-end 56 and like elements therein have like reference numerals applied thereto. The head-end includes a modem 468 substantially the same as modem 168 except that it is limited to receiving and transmitting optically encoded signals. Modem 468 may comprise a high speed transmitter model number HFBR-1001 and a high speed receiver model number HFBR-2001, both available from the Hewlett Packard Company. Modem 468 may also be provided as a Codenet 2020 fiber optic modem manufactured by Codenoll Technology Corporation of Yonkers, New York. Head-end 462 includes a synchronous time division multiplexer (STDM) 470 coupled between memory controller 172 and transmit packet circuit 178. STDMs are well known in the art, and a type such as manufactured by Paradyne Corp. as model DCX-T1 may be used in constructing head-end 462. Where no more than eight channels are required, an STDM such as manufactured by Canoga Data Corp. as model CMX 816-8 may be used.

Receive packet circuit 170 decodes the header portion of each received information packet and determines therefrom on which channel the packet is to be retransmitted. The receive packet circuit then causes the memory controller to store the packet, which was initially placed in a temporary buffer space of RAM 118, in a portion of RAM 118 associated with the particular channel. In general, each channel has a specific portion of RAM 118 associated therewith for storing packets to be transmitted on the channel. The STDM provides to the transmit packet circuit from the appropriate portions of RAM 118, at the appropriate time for each channel, the one byte signal intended for that channel. Thus, an information packet may be received on one channel and retransmitted on a different channel. Head-end clock 156 provides synchronism for the entire communication system and to this end the clock signals CLH generated thereby are applied to STDM 470. The head-end also includes an interface circuit 472 by which the users coupled, through their respective BIUs, to buses 452 and 454 may engage in communication with other users not coupled to buses 452 and 454, via telephone system trunk lines 466.

Head-end 462 further includes a plurality of timers 160, one timer for each STDM channel. Head-end 462 performs the functions previously described for head-end 56 for each of the ten channels independently of the other nine channels. To this end, the head-end employs timers 160-1, 160-2, ..., 160-10, one for each channel, to independently measure the beep propagation period 2T for each channel. Further, the head-end provides timer enable signal TENAB-1, TENAB-2, ..., TENAB-10 to make possible independent initiation of those timers. Additionally, the timers respectively provide different timeout signals TO3-1, TO3-2, ..., TO3-10, so that microprocessor 152 can differentiate between the respective statuses of the various channels. Microprocessor 152 executes a separate program for each channel in order to control communications independently on each of the channels. Thus, where there are ten channels, the microprocessor concurrently executes ten substantially identical programs in a time shared mode.

Figure 13:
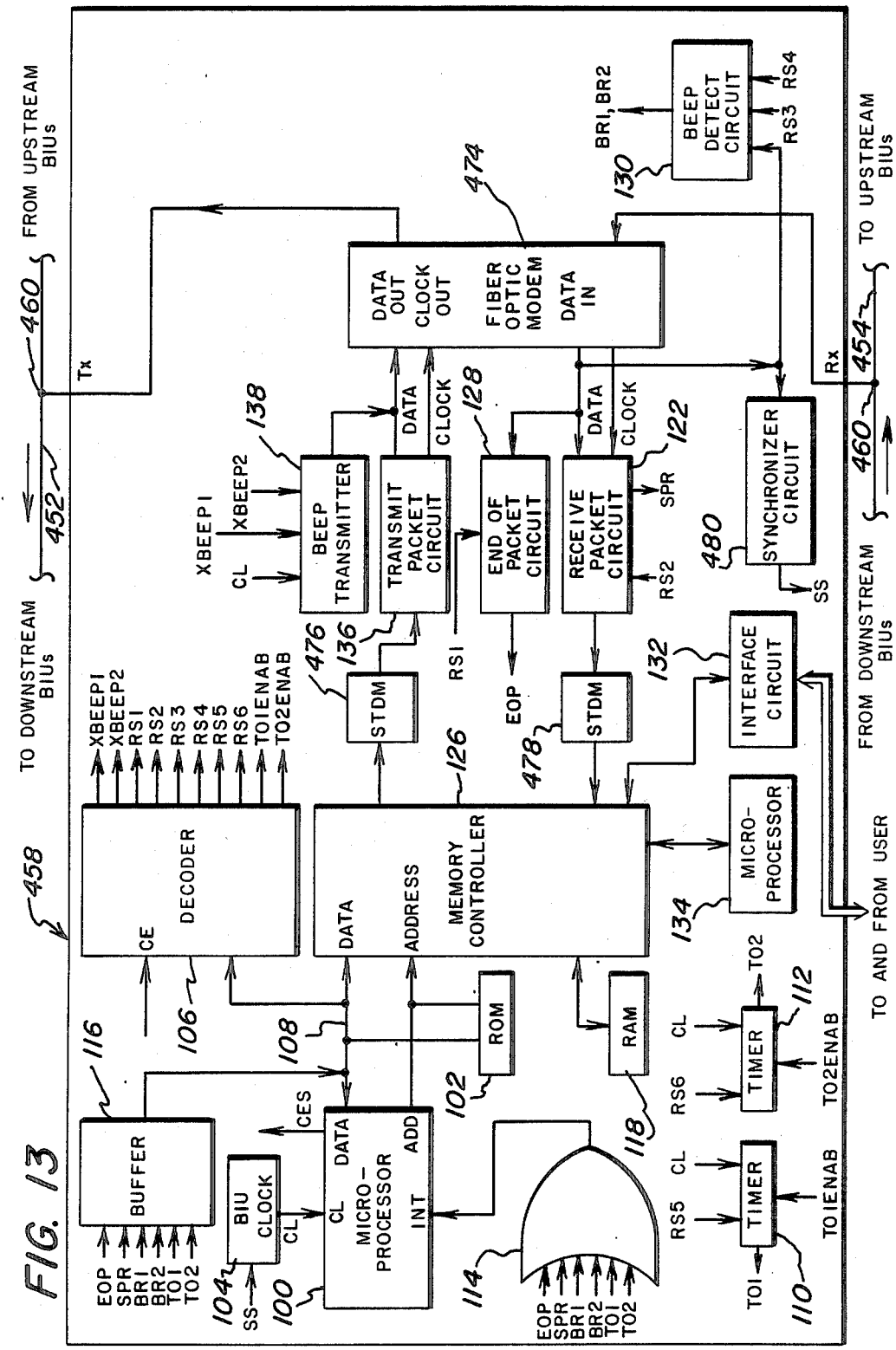
FIG. 13 is a detailed block diagram of a BIU constructed in accordance with the alternate embodiment of the present invention.

FIG. 13 illustrates BIU 458, of the alternate embodiment, which is configured substantially identically to BIU 60, like elements having like reference numerals applied thereto. Modem 474 of BIU 458 is substantially the same as modem 124 of BIU 60 except that it is limited to receiving and transmitting optically encoded signals. Modem 474 may be constructed as described above for modem 468 of head-end 462. BIU 458 includes an STDM 476 coupled between memory controller 126 and transmit packet circuit 136. A second STDM 478 is coupled between the memory controller and receive packet circuit 122. STDMs 476 and 478 are constructed substantially the same as STDM 470 of head-end 462. STDM 476 provides to the transmit packet circuit, at the time interval corresponding to the channel assigned to the particular BIU, the one byte signal to be transmitted. After an initial period of operation during which STDM 478 synchronizes with the signals received on the receive bus, STDM 478 controls the operation of the receive packet circuit so that it only receives the one byte signal occurring during the time interval corresponding to the BIU assigned channel. STDM 478 controls operation of the end-ofpacket and beep detect circuits in a similar manner. The control connections by which STDM 478 controls operations of these circuits are not shown.

In order to maintain synchronism with the head-end, each BIU 458 includes a synchronizer circuit 480 having an input coupled to the DATA IN output of modem 474. Synchronizer 480 includes a differentiating circuit which forms pulses, received from the receive bus via the modem, into sharp peaks. These peaks are applied as a synchronizer signal (SS) to BIU clock 104 so that the clock signals generated thereby fall into synchronism with the pulses on the receive bus. Since the latter pulses are transmitted by head-end 462, BIU 458 operation is synchronized with the head-end. As a result, all BIUs and the head-end operate in synchronism, as is required is a time division multiplexed system.

The operation of the time division multiplexed system is substantially the same as that described above with respect to system 50 except that a BIU only contends, for access to the bus, with other BIUs assigned to the same channel. Each BIU in system 450 executes the same program as described above for BIU 60. Note that head-end 462 transmits startup packets on the time division channels at different times, the time of startup packet transmission on each channel being determined in part by whether the BIUs on the particular channel have completed their information packet transmissions.

The use of synchronous time division multiplexing as described above for the alternate embodiment, enables implementation of multiple communication channels on a bus system. The same multiple channel result can be achieved, using coaxial cable bus, where radio frequency signals are transmitted on the buses and the signals are frequency division multiplexed. In such a case, each of a plurality of channels is assigned a unique frequency for signal transmission. As a result, a BIU assigned to a particular channel transmits and receives signals only at the unique frequency associated with its channel.

While the method of the present invention as disclosed herein may be practiced using two priority classifications of information packets, the invention is not so limited. More than two priority classifications can be used in which case the beep transmitter in each BIU is adapted to transmit a beep uniquely indicative of each priority. Where more than two priority classifications are used, it is necessary to adapt the beep detect circuit to detect all such priority beeps and transmit appropriate control signals respectively representative thereof. Then, each BIU queues beeps received during the beep propagation period in accordance with the priorities of the beeps received.

The signal propagation times along the transmit and receive buses between a particular BIU and the head-end are substantially equal as disclosed hereinabove. The invention, is, however, not so limited. The present invention may be practiced with the propagation times along the buses being different provided that timer 110 (FIGS. 2 and 10) is set equal to the sum of the propagation times along the two buses so that it times out when a BIU receives the beep transmitted thereby.

In the practice of the present invention, a transmit state BIU, upon receipt of the end of the startup packet, substantially immediately transmits its beep. This may no always be possible depending on the other functions that microprocessor 100 is required to perform. Thus, following generation of the SRP and EOP signals, the microprocessor may be required to complete a higher priority task before responding to those signals. In such a case, the BIU may be equipped with a third timer, the operation of which is initiated upon receipt of the end of the startup packet. The third timer would measure an arbitrary third time period during which the BIU is permitted to transmit a beep. It would also be necessary to increase the period measured by timer 112 by the duration of the third time period. The duration of the third time period would be selected according to the time it is anticipated microprocessor 100 would require in order to complete higher priority tasks before responding to the startup packet.

In responding to right and left sweep startup packets, each transmit state BIU counts the number of beeps received before or after the principal beep and determines transmission ranking therefrom as described above. The transmission ranking can be determined by any arbitrary rule uniformly applied by all BIUs. Thus, a different rule may be fashioned to grant BIUs located midway along the buses a higher transmission priority than upstream or downstream BIUs.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A bus communication system, comprising:
   a transmit bus;
   a receive bus;
   means for directing signals leaving said transmit bus onto said receive bus;
   a plurality of bus interface units (BIU) respectively coupled between said transmit and receive buses at locations spaced therealong, said BIUs communicating with one another by transmitting signals on said transmit bus and receiving signals on said receive bus, each said BIU being coupled to a user device for which it both transmits and receives information packets;
   said directing means including means for intermittently transmitting a startup packet on said receive bus, each said BIU receiving said startup packet at a time determined by the signal propagation time along said receive bus;
   said startup packet initiating a propagation period having a duration at least equal to the time for a signal to propagate from a remote end of said transmit bus to a remote end of said receive bus;
   each said BIU having an information packet to transmit being in a transmit state;
   each said BIU including:
     means for transmitting a ready signal while in the transmit state upon receipt of said startup packet during said propagation period, each said transmit state BIU receiving said ready signals in a sequence determined by the signal propagation time along said transmit and receive buses;
     means for recognizing upon receipt the ready signal transmitted thereby as a principal ready signal; and
     means for determining a transmission ranking, while in said transmit state, from the position of the principal ready signal in the sequence of the received ready signals;
   a first ranked transmit state BIU commencing transmission of its information packet following said propagation period, the other transmit state BIUs transmitting their respective information packets in a sequence according to their respective transmission rankings following said first ranked BIU completing transmission of its information packet; and
   each said BIU upon completing transmission of its information packet entering a captive mode during which transmission of its information packets is precluded, said captive mode extending until completion of a subsequent propagation period during which no BIU in said system transmits said ready signal.

2. The bus communication system of claim 1 wherein said first ranked BIU is the transmit state BIU receiving its principal ready signal prior to the ready signals transmitted by the other transmit state BIUs, the transmission ranking of the other transmit state BIUs being determined such that each lower ranked BIU receives one more ready signal prior to its principal ready signal than the next higher ranked BIU, the other transmit state BIUs transmitting their respective information packets in sequence from highest to lowest transmission ranking.

3. The bus communication system of claim 2 wherein said startup packet is a first startup packet;
   said intermittent transmitting means of said directing means adapted to alternately transmit said first startup packet and a second startup packet; and
   said first ranked BIU following transmission of said second startup packet being the transmit state BIU receiving the ready signals transmitted by the other transmit state BIUs prior to receiving its principal ready signal, the other transmit state BIUs each determining a transmission ranking such that each higher ranked BIU receives one less ready signal following its principal ready signal than the next lower ranked BIU, the other transmit state BIUs transmitting their respective information packets in sequence from highest to lowest transmission ranking.

4. The bus communication system of claim 1 wherein said first ranked BIU is the transmit state BIU receiving the ready signals transmitted by the other transmit state BIUs prior to receiving its principal ready signal, the other transmit state BIUs determining their respective transmission rankings such that each higher ranked BIU receives one less ready signal following its principal ready signal than the next lower ranked BIU, the other transmit state BIUs transmitting their respective information packets in sequence from highest to lowest transmission ranking.

5. The bus communication system of claim 3 wherein the signals transmitted and received therein are synchronously time division multiplexed;
   said directing means including means for synchronous time division multiplexing of signals transmitted and received thereby; and
   each said BIU including means for synchronous time division multiplexing signals transmitted and received thereby.

6. The bus communication system of claim 5 wherein said transmit and receive buses each comprise a fiber optic cable; and
   each said BIU including means for synchronizing the transmission and receipt of signals thereby with the signals transmitted by said directing means.

7. The communication system of claim 1 wherein each of said information packets is assigned a priority classification;
   said BIU ready signal transmitting means adapted to include in the ready signal an indication of the priority classification of the information packet to be transmitted;
   each said BIU further including means for recognizing the priority classification included in the respective received ready signals; and
   said ranking determining means adapted to determine said transmission ranking also from the respective priority classifications of the received ready signals, each said transmit state BIU with a higher priority classification information packet to transmit having a transmission ranking higher than each said transmit state BIU with a lower priority classification information packet to transmit.

8. The communication system of claim 7 wherein said information packets are assigned a first or a second priority classification, the ready signals indicating these classifications respectively being designated first or second priority ready signals;
   said first ranked BIU being the transmit state BIU having a first priority classification information packet and receiving its principal ready signal prior to all other first priority ready signals, each lower ranked transmit state BIU having a first priority information packet receiving one more first priority ready signal prior to its principal ready signal than the next higher ranked BIU with a first priority classification information packet;
   each transmit state BIU with a second priority classification information packet having a lower transmission ranking than all of the transmit state BIUs having first priority information packets and determining a transmission ranking such that each lower ranked transmit state BIU with a second priority classification information packet receives one more second priority ready signal prior to its principal ready signal than the next higher ranked BIU with a second priority classification information packet; and
   said transmit state BIUs transmitting their respective information packets in sequence from highest to lowest ranking.

9. The communication system of claim 8 wherein said startup packet is a first startup packet;
   said intermittent transmitting means of said directing means adapted to alternately transmit said first startup packet and a second startup packet;
   said first ranked BIU following transmission of said second startup packet being the transmit state BIU having a first priority classification information packet and receiving all other first priority ready signal prior to receiving its principal ready signal, each lower ranked transmit state BIU having a first priority information packet receiving one more first priority ready signal after its principal ready signal than the next higher ranked BIU with a first priority classification information packet; and
   following transmission of said second startup packet, each transmit state BIU with a second priority classification information packet having a lower transmission ranking than all of the transmit state BIUs having first priority information packets and determining a transmission ranking such that each lower ranked transmit state BIU having a second priority information packet receives one more second priority ready signal after its principal ready signal than the next higher ranked BIU with a second priority classification information packet.

10. The bus communication system of claim 9 wherein the signals transmitted and received therein are synchronously time division multiplexed;
    said directing means including means for synchronous time division multiplexing of signals transmitted and received thereby; and
    each said BIU including means for synchronous time division multiplexing signals transmitted and received thereby.

11. The bus communication system of claim 10, wherein said transmit and receive buses each comprise a fiber optic cable; and each said BIU including means for synchronizing the transmission and receipt of signals thereby with the signals transmitted by said directing means.

12. The bus communication system of claim 1 wherein the signals transmitted and received therein are synchronously time division multiplexed;
   said directing means including means for synchronous time division multiplexing of signals transmitted and received thereby; and
   each said BIU including means for synchronous time division multiplexing signals transmitted and received thereby.

13. The bus communication system of claim 12 wherein said transmit and receive buses each comprise a fiber optic cable; and
   each said BIU including means for synchronizing the transmission and receipt of signals thereby with the signals transmitted by said directing means.

14. The bus communication system of claim 12, said directing means further including interface means for transmitting and receiving signals respectively to and from an external communication system, said interface means being adapted to transmit to the external system an information packet received from said transmit bus by said directing means and addressed to a user device coupled to the external system; and
   said interface means further adapted to receive from the external system an information packet addressed to a user device coupled to one of said BIUs in said bus communication system, said directing means directing the last recited information packet onto said receive bus for receipt by said BIU coupled to the addressed user device.

15. The bus communication system of claim 12 wherein the signals are multiplexed in a manner effective to create a plurality of communication channels, each said channel corresponding to a synchronously repeating time interval, said BIUs in said system each being assigned to one of said channels, each said BIU being adapted to transmit and receive signals only during the time interval corresponding to its respective assigned channel; and
   said directing means adapted to receive signals from said transmit bus respectively transmitted by said BIUs during the time intervals corresponding to said plurality of channels and transmit on said receive bus the respective received signals during the time intervals corresponding to the assigned channels of the BIUs to which said transmitting BIUs respectively transmitted the signals.

16. The bus communication system of claim 1 wherein the signals transmitted and received therein are frequency division multiplexed;
   said directing means including means for frequency division multiplexing signals transmitted and received thereby; and
   each said BIU including means for frequency division multiplexing signals transmitted and received thereby.

17. The bus communication system of claim 16, said directing means further including interface means for transmitting and receiving signals respectively to and from an external communication system, said interface means being adapted to transmit to the external system an information packet received from said transmit bus by said directing means and addressed to a user device coupled to the external system; and
   said interface means further adapted to receive from the external system an information packet addressed to a user device coupled to one of said BIUs in said bus communication system, said directing means directing the last recited information packet onto said receive bus for receipt by said BIU coupled to the addressed user device.

18. The bus communication system of claim 16 wherein the signals are multiplexed in a manner effective to create a plurality of communication channels, each said channel corresponding to a different radio frequency, said BIUs in said system each being assigned to one of said channels, each said BIU being adapted to transmit and receive signals only at the radio frequency corresponding to its respective assigned channel; and
   said directing means adapted to receive signals from said transmit bus respectively transmitted by said BIUs at the radio frequencies corresponding to said plurality of channels and transmit on said receive bus the respective received signals at the radio frequencies corresponding to the assigned channels of the BIUs to which said transmitting BIUs respectively transmitted the signals.

19. A bus interface unit (BIU) for a bus communication system, said system including a transmit bus and a receive bus for the propagation of signals thereon, said system further including means for intermittently directing a startup packet onto said receive bus for receipt by the BIUs in said system, said BIU comprising:
   means for transmitting signals on said transmit bus;
   means for receiving signals on said receive bus;
   timer means for measuring a signal propagation period having a duration at least equal to the time for a signal to propagate from a remote end of said transmit bus to a remote end of said receive bus;
   interface means for coupling said BIU to a user device, said BIU transmitting and receiving information packets for said user device, said BIU being in a transmit state when it has an information packet to transmit;
   said BIU adapted to transmit a ready signal while in the transmit state upon receipt of said startup packet, the operation of said timer means being initiated upon receipt of said startup packet;
   means for recognizing upon receipt the ready signal transmitted thereby as a principal ready signal;
   means for determining a transmission ranking while in said transmit state from the position of said principal ready signal in a sequence of ready signals received during said signal propagation period, said transmit state BIU being adapted to transmit its information packet following said signal propagation period at a time relative to information packet transmissions by other transmit state BIUs in said communication system as determined by said transmission ranking; and
   said BIU adapted to enter a captive mode upon completing transmission of its information packet, said BIU refraining from transmitting signals while in said captive mode until a subsequent signal propagation period during which no ready signals are received.

20. The BIU of claim 19 wherein said timer means is a first timer means;
   said transmit state BIU further adapted to transmit said ready signal substantially immediately upon receipt of said startup packet;

said BIU including second timer means for measuring a principal ready signal period having a duration substantially equal to the time for the ready signal transmitted by said BIU to be received thereby; and the operation of said second timer means being initiated upon receipt by said BIU of said startup packet;

whereby, the ready signal received by said transmit state BIU upon said second timer timing out is said principal ready signal.

21. The BIU of claim 19 wherein said ranking determining means determines a first transmission ranking when said principal ready signal is first in said sequence of received ready signals and a successively lower ranking for each additional ready signal received prior to said principal ready signal; and said transmit state BIU having the first transmission ranking adapted to transmit its information packet substantially immediately following said signal propagation period, each successively lower ranked BIU transmitting its information packet in sequence thereafter.

22. The BIU of claim 21 wherein said startup packet is a first startup packet, said startup packet directing means being adapted to alternately transmit said first startup packet and a second startup packet; and said ranking determining means, following receipt of said second startup packet, determining a first transmission ranking when said principal ready signal is last in said sequence of received ready signals and a successively lower transmission ranking for each additional ready signal received after said principal ready signal; and said transmit state BIU having the first transmission ranking following said second startup packet adapted to transmit its information packet substantially immediately following said signal propagation period, each successively lower ranked BIU transmitting its information packet in sequence thereafter.

23. The BIU of claim 22 wherein the signals transmitted and received in said communication system are synchronously time division multiplexed; and said BIU further including means for synchronous time division multiplexing the signals received and transmitted thereby.

24. The BIU of claim 23 wherein said transmit and receive buses each comprise a fiber optic cable.

25. The BIU of claim 19 wherein said ranking determining means determines a first transmission ranking when said principal ready signal is last in said sequence of received ready signals and a successively lower transmission ranking for each additional ready signal received after said principal ready signal; and said transmit state BIU having the first transmission ranking being adapted to transmit its information packets substantially immediately following said signal propagation period, each successively lower ranked BIU transmitting its information packet in sequence thereafter.

26. The BIU of claim 19 wherein each of said information packets is assigned a priority classification;

said BIU further adapted to include in the ready signal transmitted thereby an indication of the priority classification of the information packet to be transmitted;

said BIU further including means for recognizing the priority classifications included in the ready signals received thereby; and said ranking determining means adapted to determine said transmission ranking also from the respective priority classifications of the ready signals in said sequence of received ready signals.

27. The BIU of claim 26 wherein said information packets are assigned a first or a second priority classification, the ready signals indicating these classifications respectively being designated first or second priority ready signals;

said first ranked BIU being the transmit state BIU having a first priority classification information packet and receiving its principal ready signal prior to all other first priority ready signals, each lower ranked transmit state BIU having a first priority information packet receiving one more first priority ready signal prior to its principal ready signal than the next higher ranked BIU with a first priority classification information packet;

each transmit state BIU with a second priority classification information packet having a lower transmission ranking than all of the transmit state BIUs having first priority information packets and determining a transmission ranking such that each lower ranked transmit state BIU with a second priority classification information packet receives one more second priority ready signal prior to its principal ready signal than the next higher ranked BIU with a second priority classification information packet; and said transmit state BIUs transmitting their respective information packets in sequence from highest to lowest transmission ranking.

28. The BIU of claim 27 wherein said startup packet is a first startup packet;

said startup packet directing means adapted to alternately transmit said first startup packet and a second startup packet;

said first ranked BIU following transmission of said second startup packet being the transmit state BIU having a first priority classification information packet and receiving all other first priority ready signal prior to receiving its principal ready signal, each lower ranked transmit state BIU having a first priority information packet receiving one more first priority ready signal after its principal ready signal than the next higher ranked BIU with a first priority classification information packet; and following transmission of said second startup packet, each transmit state BIU with a second priority classification information packet having a lower transmission ranking than all of the transmit state BIUs having first priority information packets and determining a transmission ranking such that each lower ranked transmit state BIU having a second priority information packet receives one more second priority ready signal after its principal ready signal than the next higher ranked BIU with a second priority classification information packet.

29. The BIU of claim 28 wherein the signals transmitted and received in said communication system are synchronously time division multiplexed; and said BIU further including means for synchronous time division multiplexing the signals received and transmitted thereby.

30. The BIU of claim 29 wherein said transmit and receive buses each comprise a fiber optic cable.

31. The BIU of claim 19 wherein the signals transmitted and received in said communication system are synchronously time division multiplexed; and
said BIU further including means for synchronous time division multiplexing the signals received and transmitted thereby.

32. The BIU of claim 31 wherein said transmit and receive buses each comprise a fiber optic cable.

33. A method for transmitting information packets among a plurality of bus interface units (BIU) respectively coupled between a transmit bus and a receive bus at locations spaced therealong, said transmit bus coupled to said receive bus through means for directing signals leaving said transmit bus onto said receive bus, said BIUs each including means for transmitting signals on said transmit bus and receiving signals on said receive bus, each said BIU being coupled to a user device for which it both transmits and receives information packets, said method comprising the steps of:
(1) transmitting a startup packet on said receive bus for receipt by all said BIUs coupled thereto to initiate a propagation period, said propagation period having a duration at least equal to the time for a signal to propagate from a remote end of said transmit bus to a remote end of said receive bus;
(2) transmitting a ready signal, upon receipt of said start-up packet, from each BIU in a transmit state having an information packet to transmit;
(3) receiving the transmitted ready signals at each said transmit state BIU in a sequence determined by the signal propagation time along said transmit and receive buses;
(4) recognizing upon receipt at each said transmit state BIU the ready signal transmitted thereby as a principal ready signal;
(5) determining a transmission ranking for each said transmit state BIU from the position of its principal ready signal in the sequence of received ready signals;
(6) transmitting an information packet from a first ranked transmit state BIU following said propagation period;
(7) transmitting information packets from the transmit state BIUs other than said first ranked BIU in a sequence according to their respective determined transmission rankings upon said first ranked BIU completing transmission of its information packet;
(8) placing each BIU completing transmission of its information packet in a captive mode wherein the BIU refrains from further transmissions
(9) repeating steps (1) through (8); and
(10) terminating said captive mode upon completion of a subsequent propagation period during which no ready signals are transmitted.

34. The method of claim 33, said ranking determining step including the additional steps of:
counting the number of ready signals received prior to receiving the principal ready signal; and
determining the transmission ranking such that each higher ranked transmit state BIU receives one less ready signal prior to its principal ready signal than the next lower ranked BIU, the first ranked BIU receiving no ready signals prior to its principal ready signal.

35. The method of claim 34 wherein said startup packet is a first startup packet, said startup packet transmitting step including the additional step of:
alternately transmitting said first startup packet and a second startup packet;
said ranking determining step including the additional steps, only following transmission of said second startup packet, of:
counting the number of ready signals received after receiving the principal ready signal; and
determining the transmission ranking such that each higher ranked transmit state BIU receives one less ready signal after its principal ready signal than the next lower ranked BIU, the first ranked BIU receiving no ready signals after its principal ready signal.

36. The method of claim 35 wherein the signals transmitted and received by said BIUs and said directing means are synchronously time division multiplexed.

37. The method of claim 36 wherein said transmit and receive buses each comprise a fiber optic cable.

38. The method of claim 33, said ranking determining step including the additional steps of:
counting the number of ready signals received after receiving the principal ready signal; and
determining the transmission ranking such that each higher ranked transmit state BIU receives one less ready signal after its principal ready signal than the next lower ranked BIU, the first ranked BIU receiving no ready signals after its principal ready signal.

39. The method of claim 33 wherein each of said information packets has a priority classification;
said ready signal transmitting step further including transmitting said ready signal with an indication of the priority classification of the information packet to be transmitted;
said method including the additional step, prior to said ranking determining step, of:
recognizing upon receipt at each said transmit state BIU the priority classifications of the respective received ready signals;
said ranking determining step including the additional step of:
determining said transmission ranking also from the respective priority classifications of the received ready signals such that each said transmit state BIU with a higher priority classification information packet to transmit has a transmission ranking higher than each said transmit state BIU with a lower priority classification information packet to transmit.

40. The method of claim 39 wherein said information packets are assigned a first or a second priority classification, the ready signals indicating these classifications respectively being designated first or second priority ready signals, said ranking determining step comprising the additional steps of:
placing the received ready signals in a queue such that all first priority ready signals are placed ahead of all second priority ready signals and the ready signals of each priority are queued in the sequence they are received; and
determining a transmission ranking by counting the number of ready signals in the queue ahead of said principal ready signal, said first ranked BIU counting no ready signals ahead of its principal ready signal in the queue, each successively lower ranked BIU counting one additional ready signal ahead of its respective principal ready signal; and said transmitting step (7) further comprising transmitting information packets from other than said first ranked BIU in sequence from each successively lower ranked transmit state BIU.

41. The method of claim 40 wherein said startup packet is a first startup packet, said startup packet transmitting step including the additional step of:

alternately transmitting said first startup packet and a second startup packet;

said ranking determining step including the additional steps, only following transmission of said second startup packet, of:

placing the received ready signals in a queue such that all first priority ready signals are placed behind all second priority ready signals and the ready signals of each priority are queued in the sequence they are received; and determining a transmission ranking by counting the number of ready signals in the queue behind said principal ready signal, said first ranked BIU counting no ready signals behind its principal ready signal in the queue, each successively lower ranked BIU counting one additional ready signal behind its respective principal ready signal.

42. The method of claim 41 wherein the signals transmitted and received by said BIUs and said directing means are synchronously time division multiplexed.

43. The method of claim 42 wherein said transmit and receive buses each comprise a fiber optic cable.

44. The method of claim 33 wherein the signals transmitted and received by said BIUs and said directing means are synchronously time division multiplexed.

45. The method of claim 44 wherein said transmit and receive buses each comprise a fiber optic cable.

* * * * *